US009717006B2

(12) United States Patent
Haugen et al.

(10) Patent No.: US 9,717,006 B2
(45) Date of Patent: Jul. 25, 2017

(54) DEVICE QUARANTINE IN A WIRELESS NETWORK

(71) Applicant: Microsoft Technology Licensing, LLC, Redmond, WA (US)

(72) Inventors: Todd Haugen, Bellevue, WA (US); Amer A. Hassan, Kirkland, WA (US); Pascal F. Menezes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/312,501

(22) Filed: Jun. 23, 2014

(65) Prior Publication Data
US 2015/0373546 A1 Dec. 24, 2015

(51) Int. Cl.
| | |
|---|---|
| H04W 12/08 | (2009.01) |
| H04L 29/06 | (2006.01) |
| H04W 12/12 | (2009.01) |
| H04W 48/02 | (2009.01) |
| H04L 12/24 | (2006.01) |

(52) U.S. Cl.
CPC .............. *H04W 12/08* (2013.01); *H04L 63/20* (2013.01); *H04W 12/12* (2013.01); *H04W 48/02* (2013.01); *H04L 41/08* (2013.01); *H04L 63/1433* (2013.01)

(58) Field of Classification Search
CPC .... H04W 12/08; H04L 63/20; H04L 63/1433; H04L 63/1441
See application file for complete search history.

(56) References Cited

U.S. PATENT DOCUMENTS

| | | |
|---|---|---|
| 5,060,170 A | 10/1991 | Bourgeois |
| 5,717,957 A | 2/1998 | Lin |
| 5,867,709 A | 2/1999 | Klencke |
| 5,956,479 A | 9/1999 | McInerney et al. |
| 6,151,643 A | 11/2000 | Cheng et al. |
| 6,167,337 A | 12/2000 | Gillick et al. |
| 6,167,377 A | 12/2000 | Gillick et al. |
| 6,185,528 B1 | 2/2001 | Fissore |

(Continued)

FOREIGN PATENT DOCUMENTS

| | | |
|---|---|---|
| EP | 0704655 | 4/1996 |
| EP | 0816981 | 7/1998 |

(Continued)

OTHER PUBLICATIONS

"Unified Communications Interoperability Forum and Open Networking Foundation Announce Collaborative Relationship Between Unified Communications and Software-Defined Networks", Retrieved From: <http://www.businesswire.com/news/home/20131120005275/en/Unified-Communications-Interoperability-Forum-Open-Networking-Foundation> Mar. 7, 2014, Nov. 20, 2013, 2 Pages.

(Continued)

*Primary Examiner* — Linglan Edwards

(57) ABSTRACT

Techniques for device quarantine in a wireless network are described. According to various implementations, a device (e.g., a mobile client device) that requests a connection to a wireless network is placed in a quarantine state in the wireless network. Attributes of the device are determined and connection parameters are specified based on the attributes. In at least some embodiments, the device can be released from the quarantine state subject to the connection parameters.

20 Claims, 10 Drawing Sheets

(56) References Cited

U.S. PATENT DOCUMENTS

| | | |
|---|---|---|
| 6,232,972 B1 | 5/2001 | Arcuri et al. |
| 6,282,709 B1 | 8/2001 | Reha et al. |
| 6,374,369 B1 | 4/2002 | O'Donnell |
| 6,452,597 B1 | 9/2002 | Goldberg et al. |
| 6,683,982 B1 | 1/2004 | Kohn |
| 6,879,709 B2 | 4/2005 | Tian et al. |
| 7,082,211 B2 | 7/2006 | Simon et al. |
| 7,146,296 B1 | 12/2006 | Carlbom et al. |
| 7,254,257 B2 | 8/2007 | Kim et al. |
| 7,370,043 B1 | 5/2008 | Shelton et al. |
| 7,577,295 B2 | 8/2009 | Constantin et al. |
| 7,606,375 B2 | 10/2009 | Bailey et al. |
| 7,680,327 B2 | 3/2010 | Weiss |
| 7,703,036 B2 | 4/2010 | Satterfield |
| 7,729,902 B1 | 6/2010 | Gupta |
| 7,738,870 B2 | 6/2010 | Howard |
| 7,751,599 B2 | 7/2010 | Chen et al. |
| 7,765,194 B1 | 7/2010 | Sharma et al. |
| 7,779,367 B2 | 8/2010 | Oshiro et al. |
| 7,865,952 B1 * | 1/2011 | Hopwood .............. G06F 8/65 726/22 |
| 7,970,350 B2 | 6/2011 | Sheynman et al. |
| 8,015,006 B2 | 9/2011 | Kennewick et al. |
| 8,154,384 B2 | 4/2012 | Hirai |
| 8,170,298 B2 | 5/2012 | Li et al. |
| 8,194,177 B2 | 6/2012 | Jung et al. |
| 8,212,294 B2 | 7/2012 | Hoke |
| 8,213,333 B2 | 7/2012 | Greel et al. |
| 8,213,690 B2 | 7/2012 | Okada et al. |
| 8,296,673 B2 | 10/2012 | Lipstein et al. |
| 8,302,006 B2 | 10/2012 | Stanek et al. |
| 8,364,717 B2 | 1/2013 | Delling et al. |
| 8,410,903 B2 | 4/2013 | Hirai |
| 8,421,874 B2 | 4/2013 | Okamoto et al. |
| 8,488,847 B2 | 7/2013 | Nozaki et al. |
| 8,526,683 B2 | 9/2013 | Maruyama et al. |
| 8,532,347 B2 | 9/2013 | Bourdev |
| 8,538,091 B2 | 9/2013 | Kaneda et al. |
| 8,559,722 B2 | 10/2013 | Tsuji |
| 8,595,702 B2 | 11/2013 | Maybee et al. |
| 8,620,351 B2 | 12/2013 | Karaoguz |
| 8,761,512 B1 | 6/2014 | Buddemeier |
| 8,776,166 B1 * | 7/2014 | Erickson ............. H04L 63/083 726/1 |
| 8,924,315 B2 | 12/2014 | Archambeau |
| 8,935,673 B1 | 1/2015 | Ashkenazi et al. |
| 9,017,092 B1 | 4/2015 | McCracken et al. |
| 9,239,773 B1 | 1/2016 | Teplitsky et al. |
| 9,324,323 B1 | 4/2016 | Bikel et al. |
| 9,330,630 B2 | 5/2016 | Kerofsky |
| 9,367,490 B2 | 6/2016 | Huang et al. |
| 9,430,667 B2 | 8/2016 | Burba et al. |
| 9,460,493 B2 | 10/2016 | Suri et al. |
| 9,477,625 B2 | 10/2016 | Huang et al. |
| 9,510,125 B2 | 11/2016 | Raghuvanshi et al. |
| 9,606,788 B2 | 3/2017 | Nachimuthu et al. |
| 9,614,724 B2 | 4/2017 | Menezes et al. |
| 9,639,742 B2 | 5/2017 | Lee et al. |
| 2002/0041590 A1 | 4/2002 | Donovan |
| 2002/0116171 A1 | 8/2002 | Russell |
| 2002/0149924 A1 | 10/2002 | Falicoff et al. |
| 2003/0031177 A1 | 2/2003 | Robidas et al. |
| 2003/0064142 A1 | 4/2003 | Wagner et al. |
| 2003/0212543 A1 | 11/2003 | Epstein |
| 2003/0212544 A1 | 11/2003 | Acero |
| 2004/0032831 A1 | 2/2004 | Matthews |
| 2004/0040021 A1 | 2/2004 | Bharati et al. |
| 2004/0088726 A1 | 5/2004 | Ma et al. |
| 2004/0168165 A1 | 8/2004 | Kokkinen |
| 2004/0210752 A1 | 10/2004 | Rao |
| 2005/0039169 A1 | 2/2005 | Hsu et al. |
| 2005/0058297 A1 | 3/2005 | Jot et al. |
| 2005/0065789 A1 | 3/2005 | Yacoub |
| 2005/0091057 A1 | 4/2005 | Mark et al. |
| 2005/0114625 A1 | 5/2005 | Snyder |
| 2005/0144013 A1 | 6/2005 | Fujimoto et al. |
| 2005/0144616 A1 | 6/2005 | Hammond et al. |
| 2005/0165598 A1 | 7/2005 | Cote et al. |
| 2005/0198407 A1 | 9/2005 | Lee |
| 2006/0009996 A1 | 1/2006 | Lipscomb et al. |
| 2006/0036965 A1 | 2/2006 | Harris et al. |
| 2006/0058009 A1 | 3/2006 | Vogedes et al. |
| 2006/0200477 A1 | 9/2006 | Barrenechea |
| 2006/0218302 A1 | 9/2006 | Chia et al. |
| 2006/0250834 A1 | 11/2006 | Chinn et al. |
| 2006/0253491 A1 | 11/2006 | Gokturk |
| 2006/0287856 A1 | 12/2006 | He et al. |
| 2006/0290705 A1 | 12/2006 | White |
| 2007/0055752 A1 | 3/2007 | Wiegand et al. |
| 2007/0055936 A1 | 3/2007 | Dhanjal et al. |
| 2007/0074168 A1 | 3/2007 | Bates et al. |
| 2007/0128979 A1 | 6/2007 | Shackelford |
| 2007/0147318 A1 | 6/2007 | Ross et al. |
| 2007/0150428 A1 | 6/2007 | Webb |
| 2007/0157313 A1 | 7/2007 | Denton |
| 2007/0203863 A1 | 8/2007 | Gupta |
| 2007/0234048 A1 | 10/2007 | Ziv |
| 2007/0271086 A1 | 11/2007 | Peters et al. |
| 2007/0294061 A1 | 12/2007 | Carlbom et al. |
| 2008/0004877 A1 | 1/2008 | Tian |
| 2008/0069364 A1 | 3/2008 | Itou et al. |
| 2008/0089561 A1 | 4/2008 | Zhang |
| 2008/0137875 A1 | 6/2008 | Zong et al. |
| 2008/0140981 A1 | 6/2008 | Kim |
| 2008/0195388 A1 | 8/2008 | Bower et al. |
| 2008/0209354 A1 | 8/2008 | Stanek et al. |
| 2008/0215183 A1 | 9/2008 | Chen |
| 2009/0030697 A1 | 1/2009 | Cerra et al. |
| 2009/0144705 A1 | 6/2009 | Oda |
| 2009/0228820 A1 | 9/2009 | Kim et al. |
| 2009/0271735 A1 | 10/2009 | Anderson et al. |
| 2009/0292687 A1 | 11/2009 | Fan |
| 2009/0300596 A1 | 12/2009 | Tyhurst et al. |
| 2010/0004930 A1 | 1/2010 | Strope |
| 2010/0023625 A1 | 1/2010 | Lee et al. |
| 2010/0076941 A1 | 3/2010 | Dotsenko et al. |
| 2010/0114890 A1 | 5/2010 | Hagar |
| 2010/0191837 A1 | 7/2010 | Linden et al. |
| 2010/0211908 A1 | 8/2010 | Luk et al. |
| 2010/0251206 A1 | 9/2010 | Horiuchi et al. |
| 2010/0279653 A1 | 11/2010 | Poltorak |
| 2011/0006603 A1 | 1/2011 | Robinson et al. |
| 2011/0009075 A1 | 1/2011 | Jantunen et al. |
| 2011/0010171 A1 | 1/2011 | Talwar et al. |
| 2011/0010424 A1 | 1/2011 | Fox et al. |
| 2011/0023111 A1 | 1/2011 | Gunadisastra et al. |
| 2011/0052081 A1 | 3/2011 | Onoe et al. |
| 2011/0055935 A1 | 3/2011 | Karaoguz et al. |
| 2011/0064331 A1 | 3/2011 | Andres Del Valle |
| 2011/0093459 A1 | 4/2011 | Dong et al. |
| 2011/0099538 A1 | 4/2011 | Pujala et al. |
| 2011/0153324 A1 | 6/2011 | Ballinger et al. |
| 2011/0173556 A1 | 7/2011 | Czerwinski et al. |
| 2011/0208980 A1 | 8/2011 | Brooks et al. |
| 2012/0014560 A1 | 1/2012 | Obrador et al. |
| 2012/0066642 A1 | 3/2012 | Shi |
| 2012/0078690 A1 | 3/2012 | Harriman et al. |
| 2012/0084086 A1 | 4/2012 | Gilbert |
| 2012/0120678 A1 | 5/2012 | Su |
| 2012/0134139 A1 | 5/2012 | Jang et al. |
| 2012/0144288 A1 | 6/2012 | Caruso et al. |
| 2012/0169791 A1 | 7/2012 | Whitehead et al. |
| 2012/0179674 A1 | 7/2012 | Delling et al. |
| 2012/0224388 A1 | 9/2012 | Lin |
| 2012/0225652 A1 | 9/2012 | Martinez et al. |
| 2012/0231862 A1 | 9/2012 | Yamamoto |
| 2012/0232885 A1 | 9/2012 | Barbosa et al. |
| 2012/0245944 A1 | 9/2012 | Gruber |
| 2012/0250535 A1 | 10/2012 | Delling et al. |
| 2012/0253799 A1 | 10/2012 | Bangalore |
| 2012/0254153 A1 | 10/2012 | Abraham et al. |
| 2012/0271617 A1 | 10/2012 | Nakajima et al. |
| 2012/0293543 A1 | 11/2012 | Jardine-Skinner |
| 2012/0310523 A1 | 12/2012 | Delling et al. |

(56) References Cited

U.S. PATENT DOCUMENTS

| | | |
|---|---|---|
| 2013/0086461 A1 | 4/2013 | Ashley-Rollman et al. |
| 2013/0086507 A1 | 4/2013 | Poston et al. |
| 2013/0091205 A1 | 4/2013 | Kotler et al. |
| 2013/0091440 A1 | 4/2013 | Kotler et al. |
| 2013/0091453 A1 | 4/2013 | Kotler |
| 2013/0091465 A1 | 4/2013 | Kikin-Gil et al. |
| 2013/0091534 A1* | 4/2013 | Gilde ................ H04L 63/0227 726/1 |
| 2013/0097481 A1 | 4/2013 | Kotler et al. |
| 2013/0097490 A1 | 4/2013 | Kotler et al. |
| 2013/0115821 A1 | 5/2013 | Golko et al. |
| 2013/0117470 A1 | 5/2013 | Terlizzi et al. |
| 2013/0132614 A1 | 5/2013 | Bajpai et al. |
| 2013/0151441 A1 | 6/2013 | Archambeau |
| 2013/0151681 A1 | 6/2013 | Dournov et al. |
| 2013/0179067 A1 | 7/2013 | Trowbridge et al. |
| 2013/0231130 A1 | 9/2013 | Cherian et al. |
| 2013/0231862 A1 | 9/2013 | Delling et al. |
| 2013/0234913 A1 | 9/2013 | Thangadorai et al. |
| 2013/0238729 A1 | 9/2013 | Holzman et al. |
| 2013/0238819 A1 | 9/2013 | Oljaca et al. |
| 2013/0254412 A1 | 9/2013 | Menezes et al. |
| 2013/0293530 A1 | 11/2013 | Perez et al. |
| 2013/0297700 A1 | 11/2013 | Hayton et al. |
| 2013/0298185 A1 | 11/2013 | Koneru et al. |
| 2013/0315235 A1 | 11/2013 | Foo |
| 2013/0318249 A1 | 11/2013 | McDonough et al. |
| 2013/0321390 A1 | 12/2013 | Latta et al. |
| 2013/0325148 A1 | 12/2013 | Mustafa et al. |
| 2013/0335301 A1 | 12/2013 | Wong et al. |
| 2013/0339478 A1 | 12/2013 | Edge |
| 2013/0342637 A1 | 12/2013 | Felkai et al. |
| 2014/0007215 A1 | 1/2014 | Romano et al. |
| 2014/0009109 A1 | 1/2014 | Lee et al. |
| 2014/0019626 A1 | 1/2014 | Hubler et al. |
| 2014/0019896 A1 | 1/2014 | Satterfield |
| 2014/0098682 A1 | 4/2014 | Cao et al. |
| 2014/0141635 A1 | 5/2014 | Saunders |
| 2014/0157169 A1 | 6/2014 | Kikin-gil |
| 2014/0173602 A1 | 6/2014 | Kikin-gil et al. |
| 2014/0181708 A1 | 6/2014 | Kikin-gil et al. |
| 2014/0214410 A1 | 7/2014 | Jang |
| 2014/0222729 A1 | 8/2014 | Dasgupta et al. |
| 2014/0223334 A1 | 8/2014 | Jensen |
| 2014/0258405 A1 | 9/2014 | Perkin |
| 2014/0282415 A1 | 9/2014 | Ovadia et al. |
| 2014/0317602 A1 | 10/2014 | Zuo |
| 2014/0358537 A1 | 12/2014 | Gilbert |
| 2014/0359593 A1 | 12/2014 | Cohen et al. |
| 2014/0359709 A1 | 12/2014 | Nassar |
| 2014/0372112 A1 | 12/2014 | Xue et al. |
| 2015/0082291 A1 | 3/2015 | Thomas et al. |
| 2015/0082292 A1 | 3/2015 | Thomas et al. |
| 2015/0082293 A1 | 3/2015 | Thomas et al. |
| 2015/0082296 A1 | 3/2015 | Thomas et al. |
| 2015/0100312 A1 | 4/2015 | Bocchieri |
| 2015/0161993 A1 | 6/2015 | Sainath |
| 2015/0161994 A1 | 6/2015 | Tang |
| 2015/0170020 A1 | 6/2015 | Garimella |
| 2015/0277708 A1 | 10/2015 | Rodrig et al. |
| 2015/0278191 A1 | 10/2015 | Levit et al. |
| 2015/0304165 A1 | 10/2015 | Menezes et al. |
| 2015/0310040 A1 | 10/2015 | Chan et al. |
| 2015/0310261 A1 | 10/2015 | Lee et al. |
| 2015/0310858 A1 | 10/2015 | Li et al. |
| 2015/0317147 A1 | 11/2015 | Nachimuthu et al. |
| 2015/0317313 A1 | 11/2015 | Lv et al. |
| 2015/0317510 A1 | 11/2015 | Lee |
| 2015/0324555 A1 | 11/2015 | Burba et al. |
| 2015/0324556 A1 | 11/2015 | Hunt et al. |
| 2015/0324601 A1 | 11/2015 | Burba et al. |
| 2015/0325236 A1 | 11/2015 | Levit |
| 2015/0327068 A1 | 11/2015 | Hunt et al. |
| 2015/0331240 A1 | 11/2015 | Poulos |
| 2015/0331463 A1 | 11/2015 | Obie et al. |
| 2015/0347120 A1 | 12/2015 | Garg et al. |
| 2015/0347274 A1 | 12/2015 | Taylor |
| 2015/0350333 A1 | 12/2015 | Cutler et al. |
| 2015/0356759 A1 | 12/2015 | Delling et al. |
| 2015/0363339 A1 | 12/2015 | Huang et al. |
| 2015/0363919 A1 | 12/2015 | Suri et al. |
| 2015/0371409 A1 | 12/2015 | Negrila et al. |
| 2015/0373475 A1 | 12/2015 | Raghuvanshi et al. |
| 2015/0378515 A1 | 12/2015 | Powell |
| 2016/0203125 A1 | 7/2016 | Sarikaya et al. |
| 2016/0210035 A1 | 7/2016 | Rodrig et al. |
| 2016/0217092 A1 | 7/2016 | Huang et al. |
| 2016/0239987 A1 | 8/2016 | Negrila et al. |
| 2016/0379343 A1 | 12/2016 | Suri et al. |

FOREIGN PATENT DOCUMENTS

| | | |
|---|---|---|
| EP | 1055872 | 11/2000 |
| EP | 1628197 | 2/2006 |
| EP | 2590274 | 5/2013 |
| GB | 2431001 | 4/2007 |
| JP | S6140430 | 11/1981 |
| JP | 2002091477 | 3/2002 |
| WO | WO-0125943 | 4/2001 |
| WO | WO-0250590 | 6/2002 |
| WO | WO-2009082814 | 7/2009 |
| WO | WO-2011150403 | 12/2011 |
| WO | WO-2013154561 | 10/2013 |
| WO | WO-2013171481 | 11/2013 |
| WO | WO-2013184225 | 12/2013 |

OTHER PUBLICATIONS

"Unified Communications Managed API 3.0 Core SDK Documentation", retrieved from: http://msdn.microsoft.com/en-us/library/gg421023.aspx on Feb. 14, 2012, Dec. 1, 2011, 2 pages.

"Cisco Bring Your Own Device", Available at: http://www.cisco.com/c/en/us/td/docs/solutions/Enterprise/Borderless_Networks/Unified_Access/byodwp.html, Mar. 2014, 23 Pages.

Ferguson, "Five Key Criteria for adaptable SDN Wi-Fi", Retrieved From: <http://www.extremenetworks.com/five-key-criteria-for-adaptable-sdn-wi-fi/> Mar. 7, 2014, Nov. 25, 2013, 7 Pages.

Van "Unified Communication and Collaboration from the User's Perspective", retrieved from: http://www.ucstrategies.com/unified-communications-expert-view/unified-communication-and-collaboration-from-the-users-perspective.aspx on Dec. 8, 2009, Dec. 8, 2009, 2 pages.

"Non-Final Office Action", U.S. Appl. No. 13/920,323, Feb. 27, 2015, 13 pages.

"Non-Final Office Action", U.S. Appl. No. 14/304,174, Jun. 29, 2015, 15 pages.

"GPU-Accelerated Route Planning", https://www.cs.unc.edu/cms/research/summaries/GPUAcceleratedRoutePlanning.pdf, Aug. 2005, 2 pages.

"Non-Final Office Action", U.S. Appl. No. 14/456,679, Jun. 19, 2015, 22 pages.

"Restriction Requirement", U.S. Appl. No. 14/275,785, Jun. 5, 2015, 6 pages.

Abraham,"Hierarchical Hub Labelings for Shortest Paths", in Technical Report MSR-TR-MSR-TR-2012-46, Apr. 2012.

Bast,"Route Planning in Transportation Networks", in Technical Report MSR-TR-2014-4, Jan. 8, 2014, 57 pages.

Bast,"Fast Routing in Road Networks with Transit Nodes", in Proceedings of Science, vol. 316, No. 5824, Apr. 27, 2007, p. 566.

Bleiweiss,"GPU Accelerated Pathfinding", in Proceedings of the 23rd ACM Siggraph/Eurographics symposium on Graphics hardware, Jun. 20, 2008, pp. 65-74.

Cormen,"Introduction to Algorithms", The MIT Press, Jul. 31, 2009, 43 pages.

Delling,"PHAST: Hardware-Accelerated Shortest Path Trees", in Journal of Parallel and Distributed Computing, vol. 73, No. 7, Jul. 2013, 11 pages.

Delling,"Graph Partitioning with Natural Cuts", in Proceedings of the IEEE International Parallel & Distributed Processing Symposium, May 16, 2011, 15 pages.

(56) References Cited

OTHER PUBLICATIONS

Delling,"Query Scenarios for Customizable Route Planning", U.S. Appl. No. 13/649,114, Oct. 11, 2012, 27 pages.
Delling,"Customizable Route Planning", in Proceedings of the 10th International Symposium on Experimental Algorithms, May 2011, pp. 1-12.
Delling,"Faster Customization of Road Networks", in Proceedings of the 12th International Symposium on Experimental Algorithms, Jun. 5, 2013, pp. 1-12.
Delling,"Customizable Route Planning in Road Networks", in Proceedings of the Sixth Annual Symposium on Combinatorial Search, Jul. 2011, pp. 1-31.
Dong,"Image Retargeting by Content-Aware Synthesis", IEEE Transactions on Visualization and Computer Graphics, vol. XX, No. XX, Jun. 2014, Mar. 26, 2014, 14 pages.
Efentakis,"Optimizing Landmark-Based Routing and Preprocessing", in Proceedings of the Sixth ACM SIGSPATIAL International Workshop on Computational Transportation Science, Nov. 5, 2013, 6 pages.
Geisberger,"Efficient Routing in Road Networks with Turn Costs", in Proceedings of the 10th International Conference on Experimental Algorithms, May 5, 2011, 12 pages.
Gooch,"Color2Gray: Salience-Preserving Color Removal", in Journal of ACM Transactions on Graphics, vol. 24 Issue 3, Jul. 2006.
Holzer,"Engineering Multilevel Overlay Graphs for Shortest-Path Queries", in ACM Journal of Experimental Algorithmics, vol. 13, Sep. 2008, 26 pages.
Kohler,"Fast Point-to-Point Shortest Path Computations with Arc-Flags", in Proceedings of Shortest Path Computations: Ninth DIMACS Challenge, vol. 24 of DIMACS Book. American Mathematical Society, Nov. 13, 2006, pp. 1-27.
Lilly,"Robust Speech Recognition Using Singular Value Decomposition Based Speech Enhancement", IEEE Tencon, 1997, 4 pages.
Lu,"Context Aware Textures", in Journal of ACM Transactions on Graphics, vol. 26 Issue 1, Jan. 2007, 31 pages.
Madduri,"Parallel Shortest Path Algorithms for Solving Large-Scale Instances", in Proceedings of 9th DIMACS Implementation Challenge—The Shortest Path Problem, Aug. 30, 2006, 39 pages.
Meyer,"D-Stepping: A Parallelizable Shortest Path Algorithm", in Journal of Algorithms, vol. 49, Issue 1, Oct. 2003, pp. 114-152.
Ortega-Arranz,"A New GPU-based Approach to the Shortest Path Problem", in Proceedings of International Conference on High Performance Computing and Simulation, Jul. 1, 2013, 7 pages.
Perumalla,"GPU-based Real-Time Execution of Vehicular Mobility Models in Large-Scale Road Network Scenarios", in ACM/IEEE/SCS 23rd Workshop on Principles of Advanced and Distributed Simulation, Jun. 22, 2009, 9 pages.
Shan,"Image Based Surface Detail Transfer", in IEEE Computer Graphics and Applications, vol. 24 Issue 3, May 2004, 6 pages.
Shen,"Agent-based Traffic Simulation and Traffic Signal Timing Optimization with GPU", 2011 14th International IEEE Conference on Intelligent Transportation Systems, Oct. 5, 2011, pp. 145-150.
Sommer,"Shortest-Path Queries in Static Networks", in Proceedings of ACM Computing Surveys, Apr. 7, 2014, 35 pages.
Wodecki,"Multi-GPU Parallel Memetic Algorithm for Capacitated Vehicle Routing Problem", in Proceedings of Distributed, Parallel, and Cluster Computing, Jan. 21, 2014, pp. 207-214.
"Advisory Action", U.S. Appl. No. 14/304,911, Jan. 14, 2016, 2 pages.
"Corrected Notice of Allowance", U.S. Appl. No. 14/275,806, Nov. 3, 2015, 2 pages.
"Final Office Action", U.S. Appl. No. 13/923,917, Sep. 29, 2015, 6 pages.
"Final Office Action", U.S. Appl. No. 14/273,100, Mar. 3, 2016, 18 pages.
"Final Office Action", U.S. Appl. No. 14/275,274, Jan. 29, 2016, 6 pages.
"Final Office Action", U.S. Appl. No. 14/275,761, Dec. 18, 2015, 6 pages.
"Final Office Action", U.S. Appl. No. 14/275,785, Feb. 9, 2016, 11 pages.
"Final Office Action", U.S. Appl. No. 14/304,911, Nov. 13, 2015, 7 pages.
"Final Office Action", U.S. Appl. No. 14/456,679, Nov. 2, 2015, 26 pages.
"Flexible Schema for Language Model Customization", U.S. Appl. No. 14/227,492, filed Mar. 27, 2014, 20 pages.
"International Preliminary Report on Patentability", Application No. PCT/US2014/041014, Sep. 15, 2015, 6 pages.
"International Search Report and Written Opinion", Application No. PCT/US2015/036587, Oct. 8, 2015, 11 Pages.
"International Search Report and Written Opinion", Application No. PCT/US2015/022886, Aug. 31, 2015, 17 pages.
"International Search Report and Written Opinion", Application No. PCT/US2015/036859, Dec. 22, 2015, 17 pages.
"International Search Report and Written Opinion", Application No. PCT/US2015/029805, Oct. 15, 2015, 20 pages.
"Non-Final Office Action", U.S. Appl. No. 14/227,492, Aug. 13, 2015, 36 pages.
"Non-Final Office Action", U.S. Appl. No. 14/257,502, Feb. 1, 2016, 19 pages.
"Non-Final Office Action", U.S. Appl. No. 14/264,012, Mar. 10, 2016, 7 pages.
"Non-Final Office Action", U.S. Appl. No. 14/279,146, Dec. 8, 2015, 9 pages.
"Non-Final Office Action", U.S. Appl. No. 14/281,518, Feb. 26, 2016, 23 pages.
"Non-Final Office Action", U.S. Appl. No. 14/311,208, Jan. 7, 2016, 6 pages.
"Notice of Allowance", U.S. Appl. No. 13/923,969, Oct. 1, 2015, 7 pages.
"Notice of Allowance", U.S. Appl. No. 13/923,969, Nov. 30, 2015, 5 pages.
"Notice of Allowance", U.S. Appl. No. 14/254,681, Dec. 4, 2015, 9 pages.
"Notice of Allowance", U.S. Appl. No. 14/264,012, Dec. 18, 2015, 7 pages.
"Notice of Allowance", U.S. Appl. No. 14/275,761, Mar. 2, 2016, 5 pages.
"Notice of Allowance", U.S. Appl. No. 14/275,806, Feb. 25, 2016, 9 pages.
"Notice of Allowance", U.S. Appl. No. 14/304,174, Dec. 14, 2015, 8 pages.
"Notice of Allowance", U.S. Appl. No. 14/304,911, Feb. 19, 2016, 7 pages.
"Notice of Allowance", U.S. Appl. No. 14/309,911, Feb. 19, 2016, 7 pages.
"Notice of Allowance", U.S. Appl. No. 14/312,562, Jan. 7, 2016, 9 pages.
"Preinterview First Office Action", U.S. Appl. No. 14/444,987, Mar. 3, 2016, 4 pages.
"Ribbon Layout and Resizing", Retrieved on Mar. 12, 2014 at: https://msdn.microsoft.com/en-us/library/ff701790, 6 pages.
"Second Written Opinion", Application No. PCT/US2015/022887, Jan. 7, 2016, 5 pages.
"Second Written Opinion", Application No. PCT/US2015/027688, Feb. 9, 2016, 6 pages.
"Second Written Opinion", Application No. PCT/US2015/030104, Dec. 4, 2015, 7 pages.
"Second Written Opinion", Application No. PCT/US2015/030153, Dec. 4, 2015, 6 pages.
"Step by Step Microsoft Word 2013", Available at: https://dbgyan.files.wordpress.com/2013/02/0735669120_wor.pdf, Mar. 1, 2013, 576 pages.
"The Ribbon Bar", Available at: http://bioinf.scri.ac.uk/tablet/help/ribbon.shtml, Dec. 1, 2012, 36 pages.
Cvetkovic,"Image enhancement circuit using nonlinear processing curve and constrained histogram range equalization", Visual Communications and Image Processing 2004, Jan. 7, 2004, 12 pages.
Gajos,"Automatically Generating Personalized User Interfaces with Supple", In Proceedings of Artificial Intelligence, vol. 174, Issue, Aug. 1, 2010, 49 pages.

(56) References Cited

OTHER PUBLICATIONS

Gajos,"Exploring the Design Space for Adaptive Graphical User Interfaces", in Proceedings of the Working Conference on Advanced Visual Interfaces, May 6, 2006, 8 pages.
Grasset,"Image-Driven View Management for Augmented Reality Browsers", IEEE International Symposium on Mixed and Augmented Reality (ISMAR), Nov. 5, 2012, 10 pages.
Liu,"Language Model Combination and Adaptation using Weighted Finite State Transducers", in Proceedings of IEEE International Conference on Acoustics Speech and Signal Processing, Mar. 14, 2010, 4 pages.
Menezes,"Session-based Device Configuration", U.S. Appl. No. 14/257,502, filed Apr. 21, 2014, 67 pages.
Peng,"Joint and Implicit Registration for Face Recognition", Proceedings of the IEEE Computer Society Conference on Computer Vision and Pattern Recognition (CVPR'09), Jun. 2009, 8 pages.
Rosten,"Real-time Video Annotations for Augmented Reality", Advances in Visual Computing Lecture Notes in Computer Science, Jan. 1, 2005, 8 pages.
Scarr,"Improving Command Selection with Command Maps", in Proceedings of the SIGCHI Conference on Human Factors in Computing Systems, May 2012, 10 pages.
Yin,"An Associate-Predict Model for Face Recognition", Proceedings of the IEEE Conference on Computer Vision and Pattern Recognition, Jun. 2011, 8 pages.
"Final Office Action", U.S. Appl. No. 14/268,953, Sep. 14, 2016, 16 pages.
"Final Office Action", U.S. Appl. No. 14/316,802, Sep. 6, 2016, 20 pages.
"International Preliminary Report on Patentability", Application No. PCT/US2015/031270, Aug. 17, 2016, 10 pages.
"International Search Report and Written Opinion", Application No. PCT/US2015/033633, Sep. 18, 2015, 11 pages.
"Non-Final Office Action", U.S. Appl. No. 14/264,619, Nov. 2, 2016, 10 pages.
"Second Written Opinion", U.S. Appl. No. PCT/US2015/033633, Apr. 28, 2016, 7 pages.
"Corrected Notice of Allowance", U.S. Appl. No. 14/275,806, May 5, 2016, 2 pages.
"Corrected Notice of Allowance", U.S. Appl. No. 14/275,806, Jun. 2, 2016, 2 pages.
"Final Office Action", U.S. Appl. No. 14/266,795, Apr. 11, 2016, 12 pages.
"Final Office Action", U.S. Appl. No. 14/279,146, Apr. 13, 2016, 16 pages.
"International Preliminary Report on Patentability", Application No. PCT/US2015/024594, Mar. 24, 2016, 7 pages.
"International Preliminary Report on Patentability", Application No. PCT/US2015/027688, Apr. 26, 2016, 7 pages.
"International Preliminary Report on Patentability", Application No. PCT/US2015/022887, Apr. 7, 2016, 8 pages.
"International Preliminary Report on Patentability", Application No. PCT/US2015/030104, Apr. 15, 2016, 8 pages.
"International Preliminary Report on Patentability", Application No. PCT/US2015/030153, Apr. 15, 2016, 8 pages.
"International Search Report and Written Opinion", Application No. PCT/US2015/035218, May 19, 2016, 19 pages.
"Non-Final Office Action", U.S. Appl. No. 13/920,323, Apr. 5, 2016, 22 pages.
"Non-Final Office Action", U.S. Appl. No. 14/264,619, Apr. 19, 2016, 11 pages.
"Non-Final Office Action", U.S. Appl. No. 14/268,953, Apr. 19, 2016, 14 pages.
"Non-Final Office Action", U.S. Appl. No. 14/465,679, May 10, 2016, 31 pages.
"Notice of Allowance", U.S. Appl. No. 14/227,492, Apr. 19, 2016, 15 pages.
"Notice of Allowance", U.S. Appl. No. 14/275,724, May 9, 2016, 5 pages.
"Notice of Allowance", U.S. Appl. No. 14/304,911, May 23, 2016, 7 pages.
"Notice of Allowance", U.S. Appl. No. 14/311,208, Mar. 30, 2016, 8 pages.
"Notice of Allowance", U.S. Appl. No. 15/087,739, Jun. 13, 2016, 9 pages.
"Second Written Opinion", Application No. PCT/US2015/026971, Mar. 30, 2016, 7 pages.
"Second Written Opinion", Application No. PCT/US2015/027689, Apr. 1, 2016, 8 pages.
"Second Written Opinion", Application No. PCT/US2015/028383, Apr. 18, 2016, 9 pages.
"Second Written Opinion", Application No. PCT/US2015/029334, Mar. 31, 2016, 5 pages.
"Second Written Opinion", Application No. PCT/US2015/029805, May 6, 2016, 9 pages.
"Second Written Opinion", Application No. PCT/US2015/030096, Apr. 5, 2016, 6 Pages.
"Second Written Opinion", Application No. PCT/US2015/031270, May 3, 2016, 9 pages.
"Second Written Opinion", Application No. PCT/US2015/032089, Apr. 12, 2016, 8 pages.
"Second Written Opinion", Application No. PCT/US2015/033872, Apr. 21, 2016, 6 pages.
"Second Written Opinion", Application No. PCT/US2015/035219, Apr. 26, 2016, 8 pages.
"Second Written Opinion", Application No. PCT/US2015/036587, May 18, 2016, 7 pages.
"Second Written Opinion", Application No. PCT/US2015/036859, May 6, 2016, 7 pages.
"Supplemental Notice of Allowance", U.S. Appl. No. 14/275,724, May 26, 2016, 2 pages.
"Supplemental Notice of Allowance", U.S. Appl. No. 14/275,761, May 12, 2016, 2 pages.
"Supplemental Notice of Allowance", U.S. Appl. No. 14/275,761, Jun. 08, 2016, 2 pages.
"Supplemental Notice of Allowance", U.S. Appl. No. 14/304,174, Apr. 26, 2016, 4 page.
"Supplemental Notice of Allowance", U.S. Appl. No. 14/312,562, Apr. 28, 2016, 2 pages.
"Final Office Action", U.S. Appl. No. 12/573,157, Feb. 17, 2015, 18 pages.
"Final Office Action", U.S. Appl. No. 12/573,157, Jul. 5, 2013, 18 pages.
"Final Office Action", U.S. Appl. No. 14/257,502, Jul. 21, 2016, 19 pages.
"Final Office Action", U.S. Appl. No. 14/264,619, Aug. 12, 2016, 12 pages.
"Final Office Action", U.S. Appl. No. 14/281,518, Aug. 25, 2016, 29 pages.
"Final Office Action", U.S. Appl. No. 14/456,679, Aug. 31, 2016, 33 pages.
"First Action Interview Office Action", U.S. Appl. No. 14/444,987, Aug. 24, 2016, 9 pages.
"International Preliminary Report on Patentability", Application No. PCT/US2015/028383, Jul. 18, 2016, 10 pages.
"International Preliminary Report on Patentability", Application No. PCT/US2015/030113, Jul. 14, 2016, 11 Pages.
"International Preliminary Report on Patentability", Application No. PCT/US2015/029805, Jul. 27, 2016, 11 pages.
"International Preliminary Report on Patentability", Application No. PCT/US2015/033872, Jul. 1, 2016, 6 pages.
"International Preliminary Report on Patentability", Application No. PCT/US2014/041023, Nov. 13, 2015, 7 pages.
"International Preliminary Report on Patentability", Application No. PCT/US2015/017872, Dec. 14, 2015, 7 pages.
"International Preliminary Report on Patentability", Application No. PCT/US2015/030096, Jul. 14, 2016, 8 pages.
"International Preliminary Report on Patentability", Application No. PCT/US2015/029334, Jul. 18, 2016, 8 pages.
"International Preliminary Report on Patentability", Application No. PCT/US2015/026971, Aug. 10, 2016, 8 pages.

(56) References Cited

OTHER PUBLICATIONS

"International Preliminary Report on Patentability", Application No. PCT/US2015/027409, Jun. 16, 2016, 9 pages.
"International Preliminary Report on Patentability", Application No. PCT/US2015/035219, Jun. 23, 2016, 9 pages.
"International Preliminary Report on Patentability", Application No. PCT/US2015/032089, Jun. 29, 2016, 9 pages.
"International Preliminary Report on Patentability", Application No. PCT/US2015/027689, Jul. 18, 2016, 9 pages.
"International Search Report and Written Opinion", Application No. PCT/US20156/021921, Jul. 7, 2015, 11 pages.
"International Search Report and Written Opinion", Application No. PCT/US2015/021921, Jul. 17, 2015, 11 pages.
"Invitation to Pay Additional Fees/Partial International Search Report", Application No. PCT/US2015/033950, Feb. 23, 2016, 6 pages.
"Non-Final Office Action", U.S. Appl. No. 12/573,157, Apr. 23, 2014, 19 pages.
"Non-Final Office Action", U.S. Appl. No. 12/573,157, Aug. 20, 2015, 17 pages.
"Non-Final Office Action", U.S. Appl. No. 12/573,157, Nov. 28, 2012, 11 pages.
"Non-Final Office Action", U.S. Appl. No. 13/923,917, Jun. 30, 2016, 9 pages.
"Non-Final Office Action", U.S. Appl. No. 14/264,012, Aug. 10, 2016, 8 pages.
"Non-Final Office Action", U.S. Appl. No. 14/265,110, Jan. 4, 2016, 26 pages.
"Non-Final Office Action", U.S. Appl. No. 14/266,795, Jul. 19, 2016, 12 pages.
"Non-Final Office Action", U.S. Appl. No. 14/275,785, Sep. 9, 2016, 14 pages.
"Non-Final Office Action", U.S. Appl. No. 14/279,146, Aug. 3, 2016, 15 pages.
"Non-Final Office Action", U.S. Appl. No. 14/296,644, Aug. 4, 2016, 25 pages.
"Non-Final Office Action", U.S. Appl. No. 14/316,802, Jul. 8, 2016, 17 pages.
"Non-Final Office Action", U.S. Appl. No. 14/338,078, Jun. 16, 2016, 19 pages.
"Non-Final Office Action", U.S. Appl. No. 14/529,636, Jul. 19, 2016, 12 pages.
"Notice of Allowance", U.S. Appl. No. 12/573,157, Jun. 6, 2016, 10 pages.
"Notice of Allowance", U.S. Appl. No. 13/923,917, Mar. 4, 2016, 5 pages.
"Notice of Allowance", U.S. Appl. No. 13/923,917, Dec. 15, 2015, 7 pages.
"Notice of Allowance", U.S. Appl. No. 14/201,704, Dec. 18, 2015, 7 pages.
"Notice of Allowance", U.S. Appl. No. 14/227,492, Aug. 4, 2016, 11 pages.
"Notice of Allowance", U.S. Appl. No. 14/265,110, Aug. 3, 2016, 22 pages.
"Notice of Allowance", U.S. Appl. No. 14/311,208, Jul. 19, 2016, 8 pages.
"Second Written Opinion", Application No. PCT/US2015/021921, Feb. 11, 2016, 7 pages.
"Second Written Opinion", Application No. PCT/US2015/027409, Mar. 18, 2016, 8 pages.
"Second Written Opinion", Application No. PCT/US2015/030113, Mar. 21, 2016, 8 pages.
"Second Written Opinion", Application No. PCT/US2015/035218, Jul. 27, 2016, 7 pages.
"Second Written Opinion", Application No. PCT/US2015/036595, May 31, 2016, 6 pages.
"Supplemental Notice of Allowance", U.S. Appl. No. 14/275,724, Jul. 6, 2016, 2 pages.
"Supplemental Notice of Allowance", U.S. Appl. No. 14/275,724, Aug. 3, 2016, 2 pages.
Astheimer,"What you see is what you hear—Acoustics applied in Virtual Worlds", in Proceedings of IEEE Symposium on Research Frontiers in Virtual Reality, Oct. 25, 1993, pp. 100-107.
Funkhouser,"Survey of Methods for Modeling Sound Propagation in Interactive Virtual Environment Systems", Retrieved from <<http://www-sop.inria.fr/reves/Nicolas.Tsingos/publis/presence03.pdf, Jan. 2003, 53 pages.
Lauterbach,"Interactive Sound Rendering in Complex and Dynamic Scenes Using Frustum Tracing", in Proceedings of IEEE Transactions on Visualization and Computer Graphics (vol. 13, Issue 6), Nov. 2007, pp. 1672-1679.
Lentz,"Virtual Reality System with Integrated Sound Field Simulation and Reproduction", In Eurasip Journal on Applied Signal Processing, Issue 1, Jan. 2007, 22 pages.
Wand,"A Real-Time Sound Rendering Algorithm for Complex Scenes", Retrieved at: <<http://web.archive.org/web/20090605124135/http://www.mpi-de/~mwand/papers/tr03.pdf>>, Jul. 2003, 13 pages.
"Notice of Allowance", U.S. Appl. No. 14/257,502, Nov. 21, 2016, 12 pages.
"International Preliminary Report on Patentability", Application No. PCT/US2015/036587, Sep. 12, 2016, 7 pages.
"International Preliminary Report on Patentability", Application No. PCT/US2015/036595, Oct. 7, 2016, 8 pages.
"International Preliminary Report on Patentability", Application No. PCT/US2015/036859, Oct. 7, 2016, 8 pages.
"Non-Final Office Action", U.S. Appl. No. 14/281,518, Dec. 16, 2016, 27 pages.
"Non-Final Office Action", U.S. Appl. No. 14/316,802, Dec. 2, 2016, 22 pages.
"Notice of Allowance", U.S. Appl. No. 4/456,679, Nov. 30, 2016, 15 pages.
"Final Office Action", U.S. Appl. No. 14/266,7995, Jan. 17, 2017, 11 pages.
"Final Office Action", U.S. Appl. No. 14/296,644, Jan. 12, 2017, 30 pages.
"Final Office Action", U.S. Appl. No. 14/338,078, Dec. 30, 2016, 32 pages.
"Final Office Action", U.S. Appl. No. 14/529,636, Jan. 31, 2017, 15 pages.
"Final Office Action", U.S. Appl. No. 15/076,125, Dec. 8, 2016, 6 pages.
"International Preliminary Report on Patentability", Application No. PCT/US2015/033950, Dec. 15, 2016, 14 pages.
"International Preliminary Report on Patentability", Application No. PCT/US2015/033545, Dec. 15, 2016, 8 pages.
"Non-Final Office Action", U.S. Appl. No. 14/268,953, Jan. 26, 2017, 15 pages.
"Non-Final Office Action", U.S. Appl. No. 14/273,100, Jan. 30, 2017, 14 pages.
"Notice of Allowance", U.S. Appl. No. 14/264,012, Jan. 5, 2017, 8 pages.
"Notice of Allowance", U.S. Appl. No. 14/456,679, Nov. 30, 2016, 15 pages.
"Final Office Action", U.S. Appl. No. 14/275,785, Apr. 24, 2017, 16 pages.
"Non-Final Office Action", U.S. Appl. No. 15/259,396, Apr. 7, 2017, 7 pages.
"Notice of Allowance", U.S. Appl. No. 14/264,619, Mar. 1, 2017, 6 pages.
"Notice of Allowance", U.S. Appl. No. 14/316,802, Apr. 20, 2017, 8 pages.
"Notice of Allowance", U.S. Appl. No. 14/444,987, Mar. 15, 2017, 8 pages.
"Notice of Allowance", U.S. Appl. No. 15/076,125, Feb. 21, 2017, 5 pages.

* cited by examiner

DEVICE QUARANTINE IN A WIRELESS NETWORK

BACKGROUND

Mobile computing devices have been developed that increase the functionality that is made available to users in a mobile setting. For example, a user may interact with a mobile phone, tablet computer, or other mobile computing device to check email, surf the web, write texts, interact with applications, and so on. In an enterprise setting, a user may utilize a personal mobile device to engage in enterprise-related activities, such as online meetings, content creation and/or sharing, and so forth.

While the proliferation of mobile devices provides users with a variety of choices when selecting a mobile device, the diversity of mobile devices also presents challenges from a network performance perspective. For instance, since a wide variety of different mobile devices exist with a varied assortment of capabilities and operating environments, some devices may not be compatible with some network components.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for device quarantine in a wireless network are described. According to various implementations, a device (e.g., a mobile client device) that requests a connection to a wireless network is placed in a quarantine state in the wireless network. Attributes of the device are determined and connection parameters are specified based on the attributes. In at least some embodiments, the device can be released from the quarantine state subject to the connection parameters.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
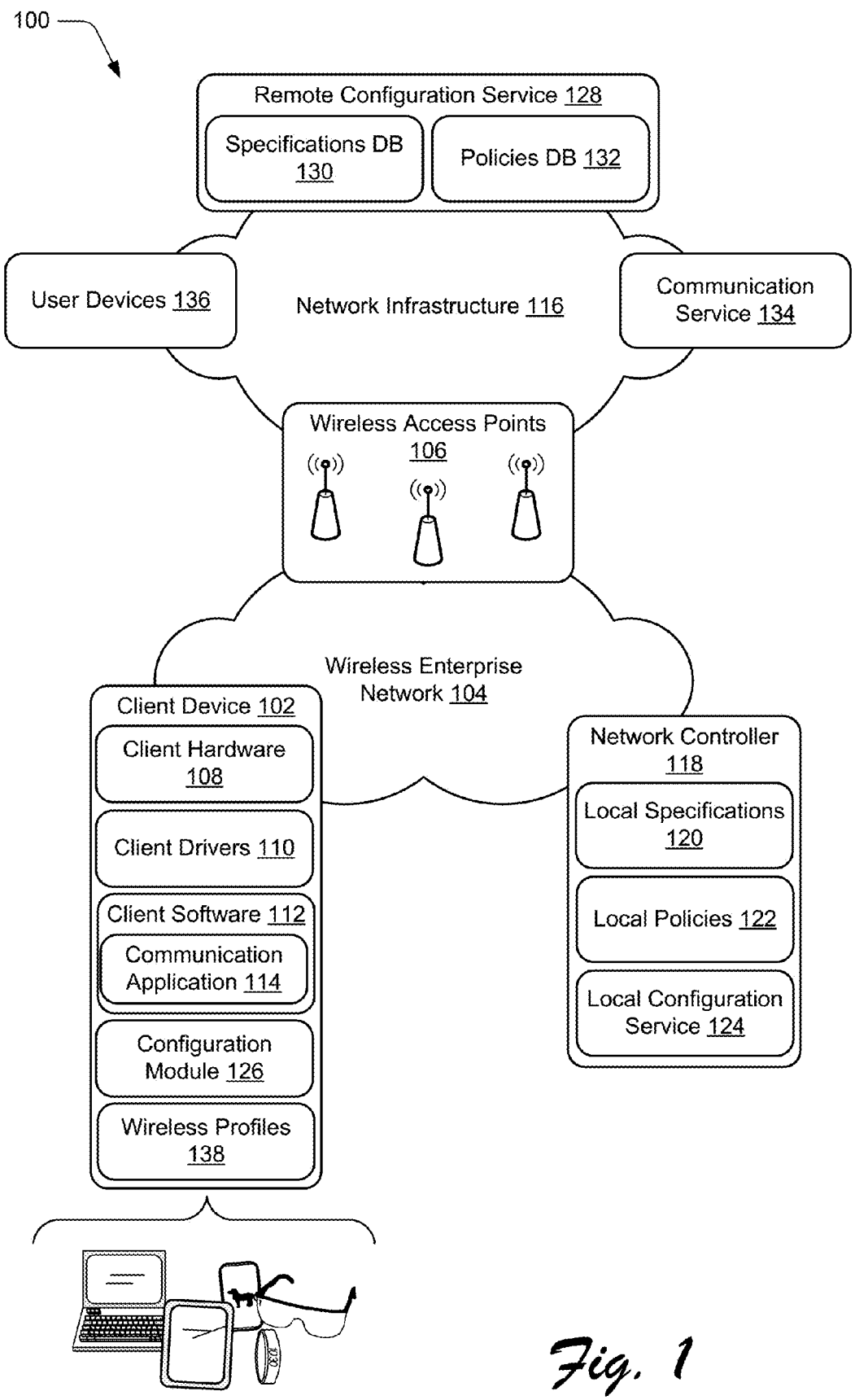
FIG. 1 is an illustration of an environment in an example implementation that is operable to employ techniques discussed herein.

Techniques for device quarantine in a wireless network are described. According to various implementations, a device (e.g., a mobile client device) that requests a connection to a wireless network is placed in a quarantine state in the wireless network. Generally, the quarantine state provides the device with a limited set of network access permissions for the wireless network. In the quarantine state, for instance, the device is permitted to interact with an administrative functionality of the wireless network, such as a network controller. While in the quarantine state, however, the device may not be permitted general access to the wireless network, such as to access an Intranet associated with the wireless network or communicate with other client devices associated with the wireless network.

According to one or more implementations, a configuration service for the wireless network interacts with the device to identify different attributes of the device, such as hardware, software, device drivers, and so forth, installed on the device. The configuration service, for instance, may be implemented locally to the wireless network, such as by a network controller. Alternatively or additionally, the configuration service may be implemented as a remote service, such as a network-based and/or cloud-based service. The configuration service compares the attributes of the device to specifications for the wireless network to determine compatibility of the device with the wireless network. For instance, the attributes of the device are compared to "known good" attributes and/or "known problem" attributes to determine if individual attributes are known to be compatible with the wireless network, or are known to have a compatibility problem (e.g., a wireless performance problem) with the wireless network.

According to various implementations, connection parameters for the device are determined based on the comparison of the device attributes to the specifications for the wireless network. Connection parameters, for instance, may specify prospective (e.g., expected) wireless performance quality for the device while connected to the wireless network. Alternatively or additionally, connection parameters may specify changes that may be applied to the device to mitigate an identified compatibility problem. Examples of such changes include software updates, device driver updates, changes in device settings, and so forth.

According to one or more implementations, the device is released from the quarantine state subject to the connection parameters. For instance, if a fix to a compatibility problem is available, the device may be notified and/or instructed to apply the fix. If a fix is not available, the device may be notified that the device may experience wireless performance problems while connected to the wireless network. For instance, a graphical user interface (GUI) may be displayed on the device informing a user that a known compatibility issue exists between the device and the wireless network, and thus the user may experience wireless performance problems while connected to the wireless network.

According to various implementations, releasing the device from the quarantine state enables the device to access the wireless network based on an expanded set of access permissions, e.g., expanded with regard to the quarantine state. The device, for instance, may allowed general access to the wireless network, such as access to Intranet resources of the wireless network. Alternatively, the device may be allowed limited access to the wireless network, such as access that excludes a problematic activity associated with an identified compatibility problem. For instance, the device may be prohibited from engaging in a high-bandwidth activity, such as a video call. Various other details and implementations are discussed below.

In the following discussion, an example environment is first described that is operable to employ techniques described herein. Next, a section entitled "Example Implementation Scenario" describes an example implementation scenario for device quarantine in a wireless network in accordance with one or more embodiments. Following this, a section entitled "Example Procedures" describes some example procedures for device quarantine in a wireless network in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for device quarantine in a wireless network described herein. Generally, the environment 100 includes various devices, services, and networks that enable communication via a variety of different modalities. For instance, the environment 100 includes a client device 102 associated with and/or connected to a wireless enterprise network (WEN) 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), a wearable computing device, and so forth.

The WEN 104 is representative of a network that provides the client device 102 with connectivity to various networks and/or services, such as the Internet. The WEN 104 may be provided and/or managed by a particular enterprise entity, such as a business entity, an educational institution (e.g., a university), a government institution, and so forth. As used herein, the term "enterprise" generally refers to an entity or group of entities that may maintain a wireless data network for various purposes. The WEN 104 may provide the client device 102 with wireless connectivity via a variety of different connectivity technologies, such as broadband cable, digital subscriber line (DSL), wireless data connectivity (e.g., WiFi™), T-carrier (e.g., T1), Ethernet, and so forth.

The WEN 104 is implemented at least in part via wireless access points (WAP) 106, which are representative of functionality to transmit and receive wireless data as part of the WEN 104. The WAP 106, for instance, provide wireless connectivity for the client device 102 and other wireless-enabled devices.

The client device 102 further includes client hardware 108, client drivers 110, and client software 112. The client hardware 108 is representative of different types and instances of hardware and/or devices of the client device 102. Examples of the client hardware 108 include wireless hardware that enable the client device 102 to transmit and receive wireless data, such as antennas, radios, filters, receivers, transmitters, and so forth. Other examples of the client hardware 108 include input/output (I/O) devices, processing devices, data storage devices, and so forth. Some specific examples of different instances and types of the client hardware 108 are discussed below with reference to the computing device 1302 discussed below with reference to FIG. 13.

The client drivers 110 are representative of functionality to enable interaction between components of the client device 102 and the client hardware 108, and vice-versa. In at least some implementations, the client drivers 110 include a wireless driver that is representative of functionality to enable interaction between components of the client device 102 and the wireless devices of the client hardware 108, and vice-versa.

The client software 112 is representative of functionality to enable different tasks to be performed via the client device 102. For instance, the client software 112 represents different applications and/or services that may execute at least in part on the client device 102. Examples of the client software 112 include a word processor, an email client, a web browser, and so forth.

The client software 112, for example, includes a communication application 114, which is representative of functionality to enable different forms of communication via the client device 102. Examples of the communication application 114 include a voice communication application (e.g., a VoIP client), a video communication application, a messaging application, a content sharing application, a Unified Communication and Collaboration (UC&C) application, and combinations thereof. The communication application 114, for instance, enables different communication modalities to be combined to provide diverse communication scenarios. According to one or more embodiments, the communication application 112 represents an application that is installed on the client device 102. Additionally or alternatively, the communication application 112 can be implemented as a remote application that is accessible via a web browser, a web application, and so forth.

The environment 100 further includes a network infrastructure 116, which is representative of different connected components that exchange, process, and/or route data among various entities. The network infrastructure 116, for instance, represents different networks and/or sub-networks that can be provided and managed by different entities, such as Internet service providers (ISPs). For example, the WAP 106 are connected to the network infrastructure 116 (e.g., by a wired and/or wireless connection) to provide the WAP 106 with network connectivity, such as to the Internet, the web, other enterprise networks, and so forth. The client device 102, for instance, may wirelessly connect to the WAP 106 to provide the client device 102 with connectivity to the network infrastructure 116.

In at least some embodiments, the network infrastructure 116 enables different forms of communication. The network infrastructure 116, for example, enables transmission and receipt of voice data, video data, content data, and so forth. In at least some embodiments, the network infrastructure 116 represents a UC&C-enabled network.

The environment 100 further includes a network controller 118, which is representative of functionality to manage various aspects of the WEN 104. The network controller 120, for instance, is connected to the WEN 104 and maintains state awareness of different components of the WEN 104. For example, the network controller 120 maintains a mapping of the WAP 106 (e.g., in terms of location) and performance attributes of the WAP 106, such as signal quality for the different WAP 106, quality of service (QoS) attributes of the WAP 106, and so forth. The network controller 120, for instance, may be implemented as a software-defined networking (SDN) controller for managing various aspects of the WEN 104.

The network controller 118 includes and/or maintains local specifications 120, which is representative of functionality to track performance and/or compatibility attributes of various hardware and/or software components for the WEN 104. The local specifications 120, for instance, represents a database that identifies instances and/or versions hardware and software that are known to provide at least a baseline performance level when interacting with the WEN 104. The local specifications 120 may also identify instances and/or versions hardware and software that have known performance and/or compatibility problems. Further implementations details concerning the local specifications 120 are discussed below.

The network controller 120 further maintains local policies 122, which are representative of different rules and parameters for the WEN 104. The local policies 122, for instance, specify particular behaviors and/or settings for devices that connect to the WEN 104. According to various implementations, the local policies 122 specify different behaviors and/or permissions for devices (e.g., the client device 102) based on how device specifications compare to specifications indicated in the local specifications 120. Examples of different example implementations of the local policies 122 are discussed below.

According to various implementations, the network controller 118 is configured to perform different aspects of techniques for device quarantine in a wireless network discussed herein via a local configuration service 124. Generally, the local configuration service 124 is representative of functionality to interact with different wireless devices (e.g., the client device 102) to ascertain device specifications and to compare device specifications with the local specifications 120. The local configuration service 124, for instance, enables the client device 102 to be configured based on the local specifications 120. The client device 102 includes a configuration module 126 which is representative of functionality to interact with the local configuration service 124 and/or other functionalities to enable configuration of the client device 102 according to the local specifications 120 and/or the local policies 122.

The configuration module 126 may be implemented in a variety of ways, such as via software, firmware, hardware, and/or combinations thereof. According to one or more implementations, the configuration module 126 can be implemented as a physical layer (PHY) and/or media access control (MAC) layer component of the client device 102. Thus, various techniques discussed herein may be implemented at the PHY and/or MAC layer to configure the client device 102 for connection to the WEN 104.

Connected to and/or implemented as part of the network infrastructure 114 is a remote configuration service 128, which includes and/or maintains a specifications database (DB) 130 and a policies database (DB) 132. The remote configuration service 128 is representative of functionality to perform various aspects of techniques for device quarantine in a wireless network discusses herein. The remote configuration service 128, for instance, propagates specifications from the specifications DB 130 and policies from the policies DB 132 to various entities, such as the network controller 118. According to various implementations, the remote configuration service 128 may update the specifications DB 130 and/or the policies DB 132, and may enable such updates to be propagated to the network controller 118. The network controller 118 may apply the updates as updates to the local specifications 120 and/or the local policies 122, thus enabling the network controller 118 to maintain current versions of configuration specifications in the local specifications 120 and current policy versions in the local policies 122.

In at least some implementations, functionalities discussed herein with reference to the network controller 118 may additionally or alternatively be performed by the remote configuration service 128. Techniques for device quarantine in a wireless network, for example, may be implemented locally by the local configuration service 124, remotely via the remote configuration service 128, and/or combinations thereof.

The environment 100 further includes a communication service 134, which is representative of a service to perform various tasks for management of communication between the client device 102 and user devices 136. The communication service 134, for instance, can manage initiation, moderation, and termination of communication sessions. Examples of the communication service 134 include a VoIP service, an online conferencing service, a UC&C service, and so forth. In at least some embodiments, the communication service 116 may be implemented as or be connected to a private branch exchange (PBX) in communication with a Public Switched Telephone Network ("PSTN") to enable voice communication between the client device 102 and user devices 136.

According to one or more implementations, the client device 102 is configured to interface with the communication service 134 via the communication application 114 to enable communication between the client device 102 and the user devices 136. The communication application 114, for instance, represents a communication portal that is implemented and managed by the communication service 134 to enable various types of communication.

The client device 102 further includes wireless profiles 138, which are representative of functionality to store and/or track connection parameters for the WEN 104 as well as for other wireless networks. Further aspects of the wireless profiles 138 are detailed below.

Figure 2:
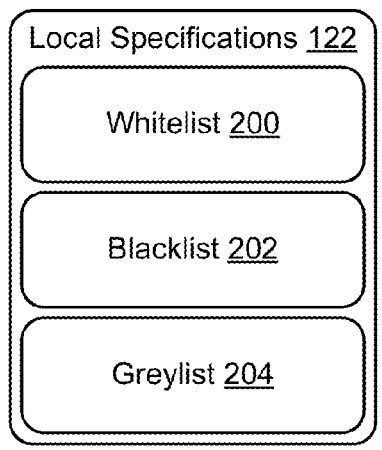
FIG. 2 illustrates local specifications for a wireless network in accordance with one or more embodiments.

FIG. 2 illustrates a detailed example of the local specifications 120, introduced above. Generally, the local specifications 120 are representative of performance and/or compatibility statuses for different device components, such as for hardware, software, device drivers, firmware, and so forth. The local specifications 120, for instance, match identifiers for instances of components with performance and/or compatibility attributes of the respective components.

The local specifications 120 include a whitelist 200, a blacklist 202, and a greylist 204. According to various implementations, the whitelist 200 identifies instances of components that are known to meet a minimum acceptable performance and/or compatibility threshold. Instances of components identified in the whitelist 200, for instance, are known to have acceptable performance attributes for data communication via the WEN 104.

The blacklist 202 identifies instances of components that are known to have performance and/or compatibility problems. Components identified in the blacklist 202, for instance, may not meet a minimum performance and/or compatibility threshold, such as for data communication over the WEN 104. The greylist 204 identifies instances of components that may have undetermined and/or untested performance and/or compatibility attributes.

In at least some implementations, the local specifications 120 may be specified with reference to compatibility with hardware infrastructure components of the WEN 104 (e.g., routers, switches, access points, and so forth), compatibility with specific applications and/or services, compatibility with particular types of data, and so forth.

The local specifications 120 may be configured and/or updated in various ways. Specifications from the specifications DB 130, for instance, can be propagated to the local specifications 120. Alternatively or additionally, the local specifications 120 can be user-configured, such as by a network administrator and/or information technology (IT) personnel associated with the WEN 104.

While the local specifications 120 are illustrated as being maintained by the network controller 118, it is to be appreciated that other entities may maintain, update, and enforce the local specifications 120. For instance, in at least some implementations, the remote configuration service 128 may maintain the local specifications 120 and may associate the local specifications 120 with the WEN 104.

Figure 3:
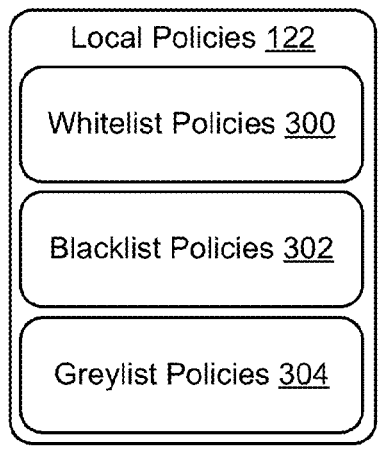
FIG. 3 illustrates local policies for a wireless network in accordance with one or more embodiments.

FIG. 3 illustrates a detailed example of the local policies 122, introduced above. Generally, the local policies 122 specify different rules, parameters, and behaviors that apply to devices that request connection to the WEN 104. The local policies 122, for instance, specify behaviors and/or actions that are to be performed based on whether device components are identified in the whitelist 200, the blacklist 202, the greylist 204, or are not specifically identified in one of the lists.

The local policies 122 include whitelist policies 300, blacklist policies 302, and greylist policies 304. The whitelist policies 300 apply when a device component is identified in the whitelist 200. The whitelist policies 300, for instance, may specify that if a device component such as a wireless device driver is identified in the whitelist 200, the device is allowed general and/or unqualified access to the WEN 104. As another example, the whitelist policies 300 may specify that if an updateable device component such as an application or a device driver is identified in the whitelist 200 and an updated version of the component is available, a user may be notified that their device meets minimum performance standards but an update is available that may increase device performance.

The blacklist policies 302 apply when a device component is identified in the blacklist 202. The following is a non-exhaustive list of example blacklist policies 302.

(1) Component Update—blacklist policies 302 may specify that if a device component is identified in the blacklist 202, a search for an update to the component is to be initiated. If an update is identified, a blacklist policy 302 may specify that the user is to be notified that the update is available and that the user is to be directed to where the update may be obtained. Alternatively or additionally, the update may be automatically retrieved and offered to the user, such as by the network controller 118.

(2) Setting Update—blacklist policies 302 may specify that if a current configuration setting of the client device 102 is identified in the blacklist 202 as being problematic and an update for the setting is available, the user is to be notified that the configuration setting update is available. For instance, the user may be notified of the update, and/or the update may be automatically applied to the client device 102, e.g., independent of user input.

(3) User Notification—blacklist policies 302 may specify that a user is to be notified that a component of the user's device is identified as not meeting a minimum performance and/or compatibility threshold, and thus wireless performance over the network may experience performance problems.

(4) Security-based Policy—blacklist policies 302 can consider security vulnerabilities that may be caused by certain components identified on the blacklist 202. For instance, a particular operating system may be identified on the blacklist 202 as having a security vulnerability that may compromise the security of the WEN 104 if the operating system interacts with the network. Further, certain applications and/or portions of executable code may be identified in the blacklist 202 as malware that may infect other network-connected devices. Accordingly, a blacklist policy 302 may specify that if a device includes a security vulnerability and/or malware that may expose other network devices to a security risk, the device is not permitted to access the WEN 104. The device, for instance, may be quarantined and given an opportunity to fix the security vulnerability.

(5) Limited Network Access—blacklist policies 302 may specify that if an attribute of the client device 102 is identified on the blacklist 202, the types of behaviors that the client device 102 may engage in over the WEN 104 is to be restricted. For instance, the client device 102 may be permitted to browse the Internet and engage in instant messaging and email, but may be prohibited from engaging in other activities such as real-time video communication and/or other resource-intensive activity.

These blacklist policies are presented for purpose of example only, and a wide variety of other blacklist policies may be employed within the spirit and scope of the claimed embodiments.

The greylist policies 304 may specify that if a device component is identified on the greylist 204, a user may be notified that performance and/or compatibility attributes of the component are unknown, and thus a quality of the user's experience while connected to the WEN 104 may be variable. In at least some implementations, the greylist policies 304 may specify that if a device component is identified on the greylist 204, a search for an update for the component is to be initiated. If an update is located and is identified on the whitelist 200, a greylist policy 304 may specify that the user is to be notified that the update is available and that the user is to be directed to where the update may be obtained. Alternatively or additionally, the update may be automatically retrieved and offered to the user, such as by the network controller 118.

In at least some implementations, the local policies 122 may specify that if a device component is not identified on the whitelist 200, the blacklist 202, or the greylist 204, a notification is to be presented indicating that performance and/or compatibility attributes of the component are unknown, and thus a quality of the user's experience while connected to the WEN 104 may be variable.

These local policies 122 are presented for purpose of example only, and it is to be appreciated that a wide variety of different policies may be employed in accordance with the claimed embodiments.

The local policies 122 may be configured and/or updated in various ways. Policies from the policies DB 132, for instance, can be propagated to the local policies 122. Alternatively or additionally, the local policies 122 can be user-configured, such as by a network administrator and/or information technology (IT) personnel associated with the WEN 104.

While the local policies 122 are illustrated as being maintained by the network controller 118, it is to be appreciated that other entities may maintain, update, and enforce the local policies 122. For instance, in at least some implementations, the remote configuration service 128 may maintain the local policies 122 and may associate the local policies 122 with the WEN 104 and may enforced the local policies 122 for the WEN 104

Having described attributes of an example environment in which the techniques described herein may operate, consider now some example implementation scenarios for device quarantine in a wireless network in accordance with one or more embodiments.

Example Implementation Scenario

The following section describes an example implementation scenario for device quarantine in a wireless network in accordance with one or more embodiments. The implementation scenario may be implemented in the environment 100 discussed above, and/or any other suitable environment.

Figure 4:
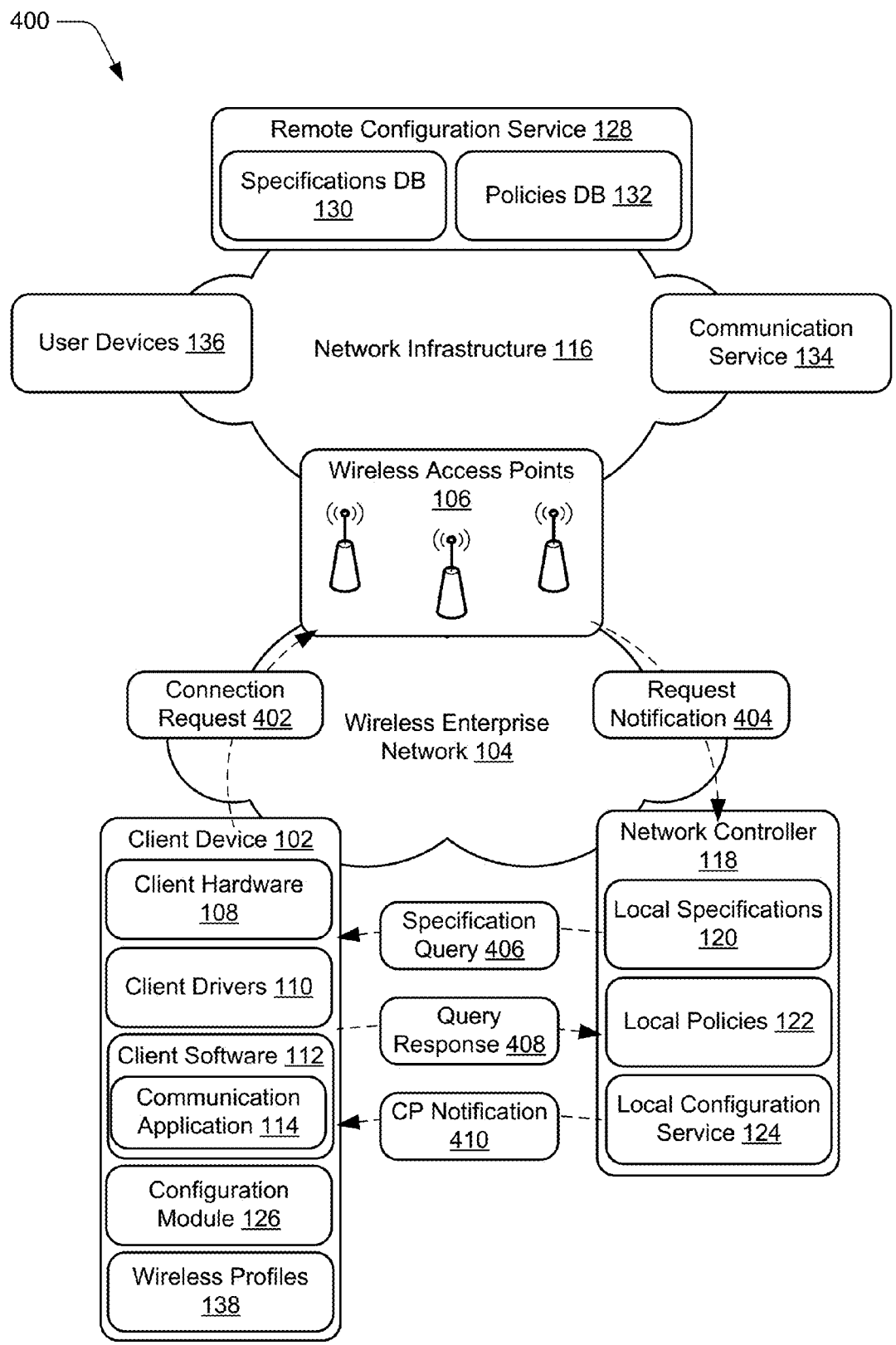
FIG. 4 illustrates an example implementation scenario for device quarantine in a wireless network in accordance with one or more embodiments.

FIG. 4 illustrates an example implementation scenario for device quarantine in a wireless network generally at 400. The scenario 400 includes various entities and components introduced above with reference to the environment 100.

In the scenario 400, the client device 102 submits a connection request 402 to a WAP 106 connect to the WEN 104. The client device 102, for instance, transmits an association request frame to a WAP 106. In response to receiving the connection request 402, the WAP 106 sends a connection request notification 404 to the local configuration service 124 of the network controller 118. The request notification 404, for instance, includes an identifier for the client device 102 and indicates that the client device 102 is requesting to connect to the WEN 104.

In at least some implementations, the WAP 106 sends the request notification 404 to the local configuration service 124 in response to determining that the client device 102 is not registered with a network domain of the WEN 104. The client device 102, for instance, is a non-domain device with regard to the WEN 104. In such implementations, the request notification 404 can include an indication that the client device 102 is a non-domain device.

In response to receiving the request notification 404, the local configuration service 124 sends a specification query 406 to the client device 102. The specification query 406, for example, queries the client device 102 for various attributes of the client device 102. Examples of such attributes include:

(1) Driver type and/or version, such as for a wireless driver of the client device 102.

(2) Quality of Service (QoS) marking capability of the client device 102.

(3) Wireless power control capability, e.g., dynamic range, power control step size, and so forth.

(4) Wireless data rate capabilities.

(5) Dynamic frequency selection speed(s).

(6) Wireless technology and/or technologies that the client device 102 utilizes and/or is capable of utilizing. Examples of such wireless technologies include the 802.11 protocols (e.g., 11b, 11g, 11af, 11n, 11ac, and so forth), ad-hoc wireless networking, Bluetooth™, and so forth.

(7) Software type(s) and/or version(s). The specification query 406, for instance, queries the client device 102 for applications and/or services that reside on the client device 102, and versions for the respective applications and/or services, capabilities of the applications and/or services, and so forth. In at least some implementations, the specification query 406 queries the client device 102 for types and/or versions of communication applications that reside on the client device 102.

(8) Software settings. The specification query 406, for instance, queries the client device 102 for different configuration settings for applications and/or services that reside on the client device 102.

(9) Hardware type(s) and/or version(s). The specification query 406, for instance, queries the client device 102 for types of hardware that reside on the client device 102, manufacturers of the hardware, hardware models and/or versions, hardware capabilities, and so forth.

(10) Hardware settings. The specification query 406, for instance, queries the client device 102 for different configuration settings for hardware that resides on the client device 102.

(11) Security-based attributes. Examples of security attributes include types and/or versions of antimalware software, whether the client device 102 includes software and/or services that have known security vulnerabilities, whether the client device 102 is infected with malware, and so forth.

These example attributes are presented for purpose of example only, and it is to be appreciated that the client device 102 may be queried for a variety of different specifications and attributes within the spirit and scope of the claimed embodiments.

Continuing with the scenario 400, the client device 102 responds to the specification query 406 with a query response 408 which identifies different attributes requested by the specification query 406. Based on the attributes identified or not identified (e.g., omitted) in the query response 408, the local configuration service 124 can perform various actions, examples of which are discussed above and below.

The local configuration service 124, for instance, compares attributes from the query response 408 to the local specifications 120 to ascertain whether attributes of the client device 102 are compatible with the local specifications 120. The local configuration service 124 may also apply the local policies 122 to the comparison of the attributes from the query response 408 to the local specifications 120. Based on this processing of the query response 408, the local configuration service 124 generates a connection parameters (CP) notification 410 and sends the CP notification 410 to the client device 102.

Generally, the CP notification 410 includes connection parameters for connection of the client device 102 to the WEN 104. The CP notification 410, for instance, notifies the client device 102 of prospective performance parameters that the client device 102 may experience while connected to the WEN 104. For example, if the query response 408 indicates that the client device 102 is using a wireless driver and/or a wireless technology that has known compatibility problems with the WEN 104, the CP notification 410 may include an indication that the client device 102 may experience network connectivity and/or performance problems while connected to the WEN 104.

In at least some implementations, the CP notification 410 may include suggestions and/or instructions that may enable the client device 102 to improve its wireless experience while connected to the WEN 104. The CP notification 410, for example, may indicate configuration changes to various configuration settings of the client device 102 that may be applied, such as settings for software, hardware, drivers, and so forth. The configuration changes may be presented as suggestions that may be applied, such as via a GUI that displays the suggestions to a user. The user may choose to apply or not apply the settings.

Alternatively, the configuration changes may be automatically applied to change configuration settings of the client device 102. The configuration module 126, for instance, may process the CP notification 410 and identify the configuration changes. The configuration module 126 may propagate the configuration changes to the appropriate functionalities with instructions to apply the changes, such as to software, drivers, hardware, and so forth. Thus, in at least some implementations, the client device 102 can be automatically configured with appropriate settings for connecting and interacting with the WEN 104.

In at least some implementations, the CP notification 410 may include an indication of an update for the client device 102, such as a driver update, a software update, and so forth. The update may be presented as a suggestion, such as via a GUI that displays the update suggestion to a user. The GUI, for instance, may identify that updateable component and may optionally provide an indication of where the update may be obtained. For example, the GUI may include a link (e.g., a hyperlink) to a website and/or other network resource where the update may be obtained.

Alternatively, the update may be automatically pushed to the client device 102 for installation. The network controller 118, for example, may have the update stored locally and/or may access a network resource to retrieve the update. The network controller 118 may then push the update to the client device 102. The configuration module 126, for example, may receive the update from the network controller 118 and may initiate installation of the update. In at least some implementations, the update may be included as part of the CP notification 410.

Further to the scenario 400, the client device 102 stores the various connection parameters as part of a wireless profile 138 for the WEN 104. The wireless profile 138, for instance, includes settings, performance attributes, updates, and so forth, indicated by the CP notification 410. In at least some implementations, a new wireless profile 138 is created for the WEN 104 and populated with connection parameters. Alternatively, an existing wireless profile 138 for the WEN 104 is updated with the connection parameters. According to various implementations, if the client device 102 disconnects from the WEN 104 and at a later time returns and reconnects to the WEN 104, the client device 102 may utilize connection parameters from the wireless profile 138 to prepare the client device 102 for connection to the WEN 104. Utilizing the wireless profile 138, for instance, may enable the client device 102 to pre-configure for subsequent connections to the WEN 104.

According to various implementations, prior to the local configuration service 124 performing an action based on the query response 408 (e.g., providing the CP notification 410), the client device 102 may be placed in a quarantine state for the WEN 104. In the quarantine state, the client device 102 may be permitted to interact with the network controller 118, but may not be permitted to access other portions of the WEN 104. For instance, while in the quarantine state, the client device 102 may not be permitted general access to the WEN 104, such as to access an Intranet and/or Intranet resources of the WEN 104, to transmit data to and receive data from user devices 118, and so forth. Examples of resources of the WEN 104 that are not accessible by a device in a quarantine state include local domain resources, such as local storage devices, local Intranet sites, local content sharing sites, and so forth.

As an example implementation, consider a scenario where the WEN 104 is implemented as a virtual network, e.g., a software-defined network. In such a scenario, the WEN 104 may be defined via "network slices" that each includes a set of associated network resources, access permissions, and so forth. Thus, a quarantine slice can be defined for devices that request access to the WEN 104. For instance, when the client device 102 initially submits the connection request 402, the client device 102 is connected to the WEN 104 based on the quarantine slice. The quarantine slice may be associated with a limited set of access permissions. The quarantine slice, for example, may allow data to be transmitted between the client device 102 and the network controller 118, but may not allow the client device to send data to other devices and/or entities.

After the local configuration service 124 receives and processes the query response 408 and performs an action based on the query response 408, the connection of the client device 102 to the WEN 104 may be transitioned to a network slice with enhanced connectivity as compared to the quarantine slice. The client device 102, for instance, may be connected to the WEN 104 based on a "guest slice" that enables the client device 102 to communicate data with other client devices, engage in communication sessions (e.g. UC&C sessions) with other devices, and to access expanded network resources, such as Intranet resources of the WEN 104.

As discussed above, the client device 102 may utilize the wireless profile 138 to pre-configure for a subsequent connection to the WEN 104. Such pre-configuration may reduce the amount of time that the client device 102 is in a quarantine state.

While implementations are discussed herein with reference to communication between the client device 102 and the local configuration service 124, it is to be appreciated that similar interactions may occur between the client device 102 and the remote configuration service 128. For instance, communications and transactions between the client device 102 and the network controller 118 discussed in the scenario 400 may additionally or alternatively occur between the client device 102 and the remote configuration service 128. Functionalities discussed with reference to the network controller 118, for instance, may be alternatively be implemented and/or performed by the remote configuration service 128.

Having discussed an example implementation scenario, consider now a discussion of some example procedures in accordance with one or more embodiments.

Example Procedures

The following discussion describes some example procedures for device quarantine in a wireless network in accordance with one or more embodiments. The example procedures may be employed in the environment 100 of FIG. 1, the system 1300 of FIG. 13, and/or any other suitable environment. Further, the example procedures may represent implementations of aspects the example implementation scenario discussed above. In at least some implementations, steps described for the various procedures can be implemented automatically and independent of user interaction.

Figure 5:
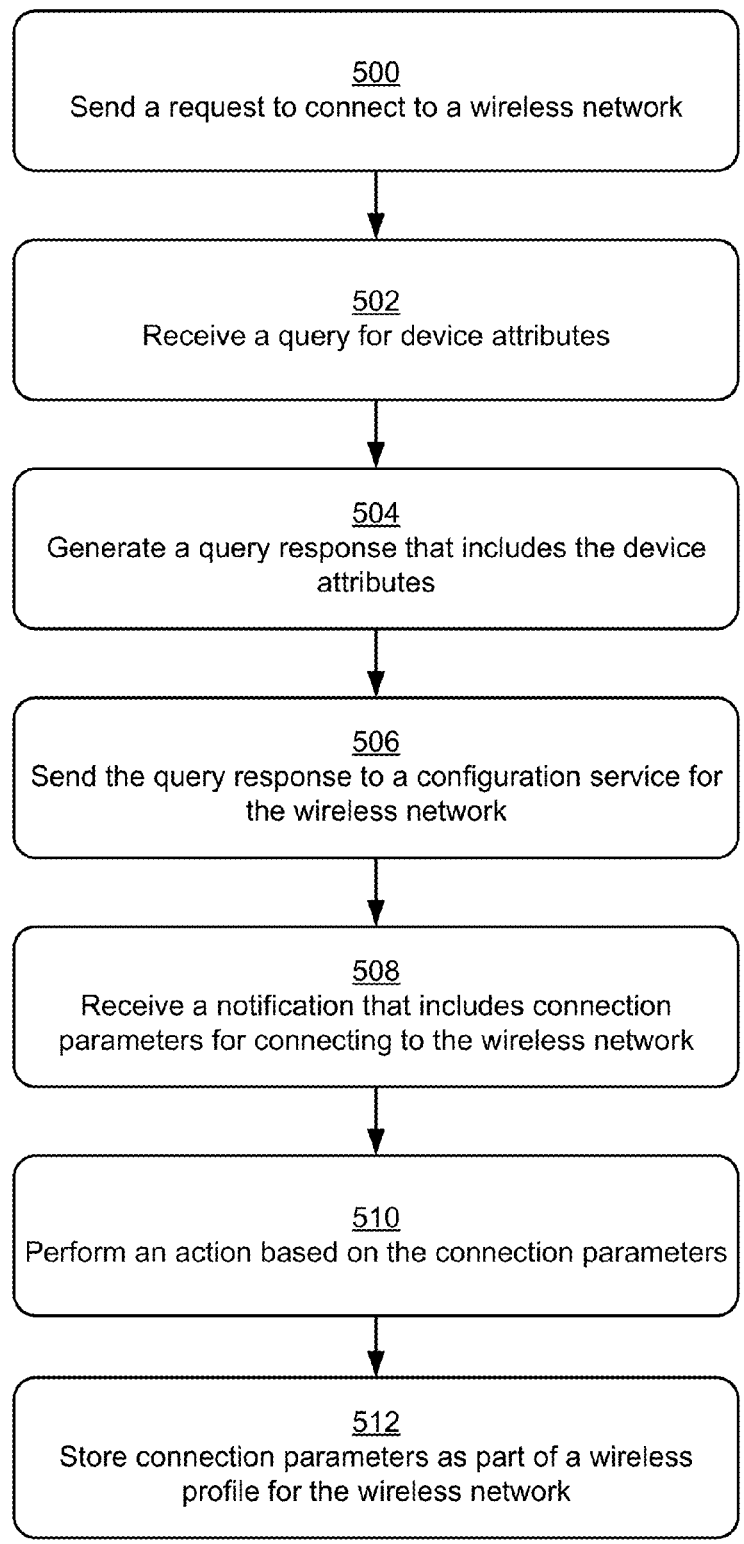
FIG. 5 is a flow diagram that describes steps in a method for connecting a device to a wireless network in accordance with one or more embodiments.

FIG. 5 is a flow diagram that describes steps in a method in accordance with one or more embodiments. The method describes an example procedure for connecting a device to a wireless network in accordance with one or more embodiments. In at least some implementations, the method can be performed by the client device 102.

Step 500 sends a request to connect to a wireless network. The client device 102, for instance, transmits a request to a WAP 106 to connect to the WEN 104. As discussed above, the WAP 106 may notify the local configuration service 124 and/or the remote configuration service 128 that the client device 102 is requesting to connect to the WEN 104.

Step 502 receives a query for device attributes. The client device 102, for instance, receives a specification query 406 from the local configuration service 124 and/or the remote configuration service 128 that includes a request for various device attributes, examples of which are detailed above. In at least some implementations, the query requests wireless attributes of the device, such as a wireless driver and/or driver version utilized by the device, wireless technologies and/or protocols utilized by the device, wireless performance attributes of the device, and so forth.

Step 504 generates a query response that includes the device attributes. The client device 102, for instance, generates a query response 408 that includes some or all of the requested attributes. In at least some implementations, the query response may be formatted as a proprietary information element and/or predefined action frame that can be sent to the local configuration service 124 and/or the remote configuration service 128 to enable the local configuration service 124 and/or the remote configuration service 128 to ascertain attributes of the client device 102.

Step 506 sends the query response to a configuration service for the wireless network. The client device 102, for instance, sends the query response 408 to the local configuration service 124 and/or the remote configuration service 128.

Step 508 receives a notification that includes connection parameters for connecting to the wireless network. The client device 102, for instance, receives the CP notification 410 that identifies various parameters for connecting to the WEN 104. In at least some implementations, the CP notification 410 includes information that is displayable and that indicates prospective performance attributes for connection to the WEN 104. One example of such a performance attribute is an indication that a device attribute (e.g., software and/or a driver) has a known compatibility problem with the WEN 104, and thus wireless performance may be less than optimal. Another example performance attribute may specify that transmission of certain data may be problematic over the WEN 104, such as video data and/or other data with larger bandwidth consumption.

Step 510 performs an action based on the connection parameters. The client device 102, for example, may display various prospective performance attributes and/or connection status information regarding connection to the WEN 104. In at least some implementations, the CP notification 410 includes configuration information for reconfiguring the client device 102, such as to improve wireless performance and/or user experience of the client device 102. Configuration information, for instance, may include changes to configuration settings for device components such as drivers, software, hardware, and so forth. Alternatively or additionally, configuration information may specify updates to components of the client device 102.

As referenced above, the configuration information may be presented (e.g., displayed) as suggestions that a user can implement, such as by manually implementing the suggestions. Alternatively or additionally, configuration information may be automatically applied to reconfigure and/or update device components. For instance, the configuration module 126 may detect the configuration information, and may implement a procedure to cause the configuration information to be applied to the client device 102. In at least some implementations, the configuration information may be applied automatically and independent of user input.

Step 512 stores the connection parameters as part of a wireless profile for the wireless network. The client device 102, for instance, stores the connection parameters as part of a wireless profile 138 for the WEN 104. As referenced above, the wireless profiles 138 can includes connection profiles for different wireless networks, and each of the connection profiles can specify connection parameters for a respective wireless network ascertained according to implementations discussed herein.

Figure 6:
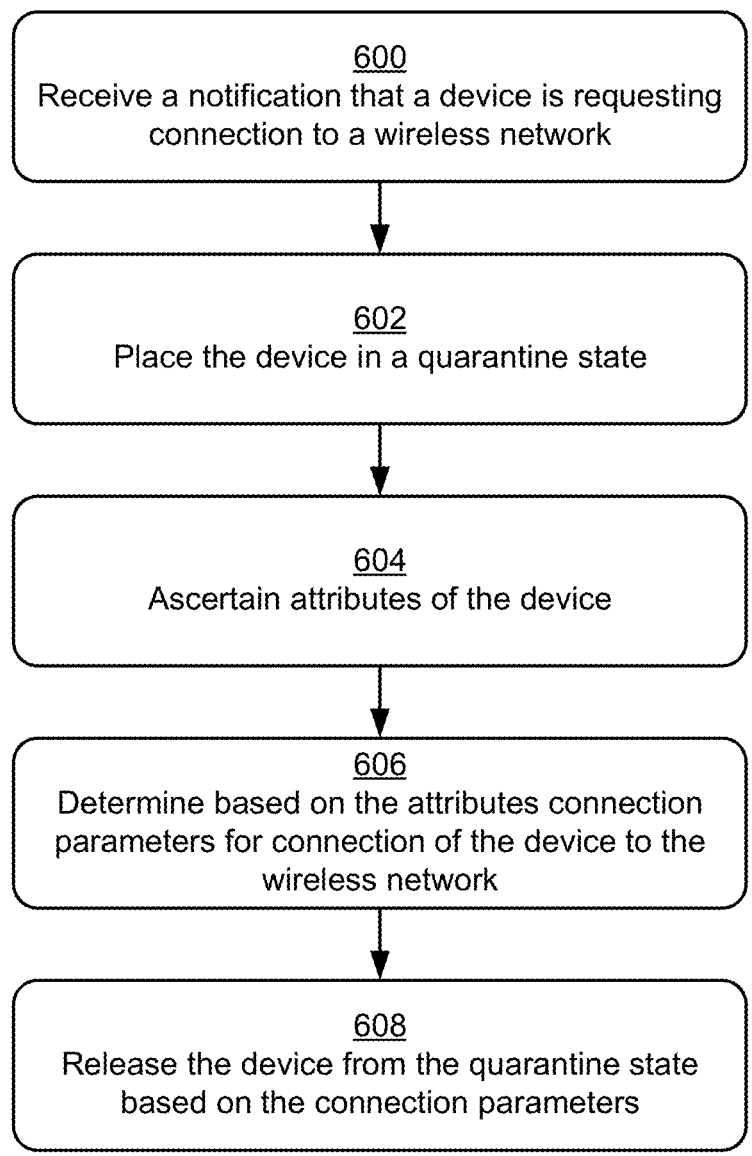
FIG. 6 is a flow diagram that describes steps in a method for connecting a device to a wireless network based on connection parameters in accordance with one or more embodiments.

FIG. 6 is a flow diagram that describes steps in a method in accordance with one or more embodiments. The method describes an example procedure for connecting a device to a wireless network based on connection parameters in accordance with one or more embodiments. In at least some implementations, the method can be performed by the local configuration service 124, a WAP 106, and/or the remote configuration service 128.

Step 600 receives a notification that a device is requesting connection to a wireless network. The local configuration service 124, for instance, receives the request notification 404 indicating that the client device 102 is requesting a connection to the WEN 104.

Step 602 places the device in a quarantine state. The local configuration service 124, for instance, notifies a WAP 106 to which the client device 102 is connected (e.g., associated) that the client device 102 is in a quarantine state. As discussed above, the quarantine state may allow the client device 102 to access the WEN 104 to interact with the network controller 118, but may prevent the client device 102 from accessing other network resources, such as an Intranet of the WEN 104, devices and/or resources of the WEN 104, and so forth. The quarantine state, for example, may provide the client device 102 with a limited set of access permissions as compared to a general access state for the WEN 104. In at least some implementations, the quarantine state may be associated with a "quarantine slice" of a virtual network.

Step 604 ascertains attributes of the device. The local configuration service 124, for instance, sends the specification query 406 to the client device 102. Based on the specification query 406, the local configuration service 124 receives the query response 408 from the client device 102. The local configuration service 124 processes the query response 408 to ascertain different attributes of the client device 102 specified in the query response 408.

Step 606 determines based on the attributes connection parameters for connection of the device to the wireless network. The local configuration service 124, for instance, compares the attributes to the local specifications 120.

Generally, comparison of device attributes to the local specifications 120 enables the local configuration service 124 to determine whether a device attribute is compatible or incompatible with the WEN 104, whether the device attribute has known performance problems for the WEN 104, and so forth. An example way of processing device attributes is discussed below.

Example connection parameters include a notification of prospective performance attributes for the client device 102 while connected to the WEN 104, a change to a configuration setting for the client device 102, an indication of an update for a component of the client device 102, and so forth.

Step 608 releases the device from the quarantine state subject to the connection parameters. The network controller 118, for example, allows the client device 102 to access the WEN 104 subject to conditions and/or behaviors specified by the connection parameters. In at least some implementations, the connection parameters include a notification (e.g., the CP notification 410) to the client device 102 that indicates prospective performance attributes for connection of the client device 102 to the WEN 104. Alternatively or additionally, the connection parameters may include changes to configuration settings of the client device 102 and/or updates to components of the client device 102.

According to various implementations, releasing the client device 102 from the quarantine state allows the client device 102 general access to the WEN 104, such as to interact with Intranet resources of the WEN 104, engage in communication with the user devices 136, and so forth.

Figure 7:
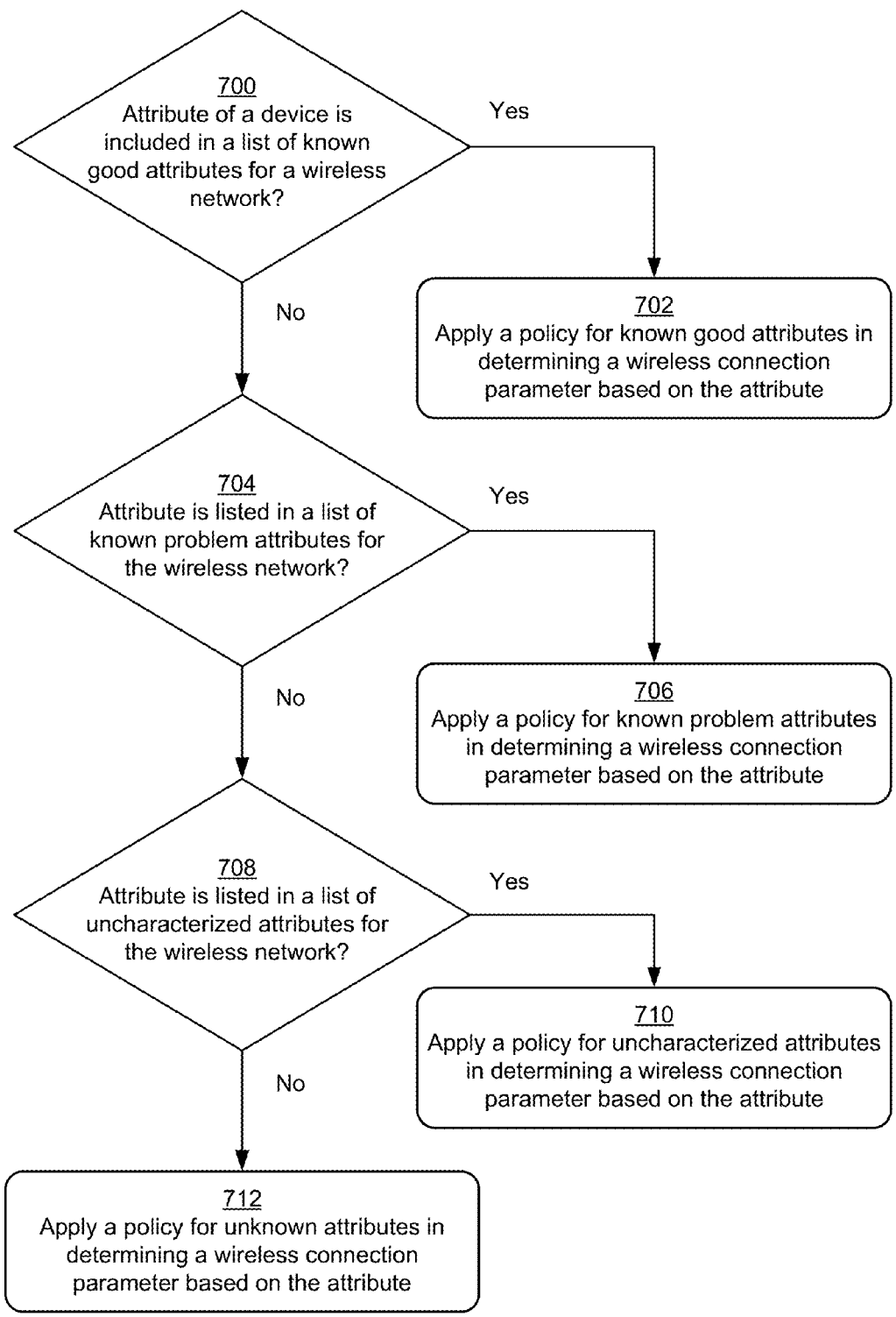
FIG. 7 is a flow diagram that describes steps in a method for determining device compatibility attributes in accordance with one or more embodiments

FIG. 7 is a flow diagram that describes steps in a method in accordance with one or more embodiments. The method describes an example procedure for determining device compatibility attributes in accordance with one or more embodiments. In at least some implementations, the method describes an example way of performing step 606 discussed above with reference to FIG. 6.

Step 700 ascertains whether an attribute of a device is included in a list of known good attributes for a wireless network. The local configuration service 124, for instance, compares an attribute of the client device 102 to attributes included in the whitelist 200.

If the attribute is listed in the known good list of attributes ("Yes"), step 702 applies a policy for known good attributes in determining a wireless connection parameter based on the attribute. The local configuration service 124, for instance, applies a whitelist policy 300 to the attribute. In at least some implementations, a whitelist policy 300 may specify that if an attribute of a device is listed in a known good list, the device is permitted general access to a wireless network.

If the attribute is not listed in the known good list of attributes ("No"), step 704 ascertains whether the attribute is listed in a list of known problem attributes for the wireless network. The local configuration service 124, for instance, compares an attribute of the client device 102 to attributes included in the blacklist 202.

If the attribute is listed in the list of known problem attributes for the wireless network ("Yes"), step 706 applies a policy for known problem attributes in determining a wireless connection parameter based on the attribute. The local configuration service 124, for instance, applies a blacklist policy 302 to the attribute. Examples of policies for known problem attributes are discussed above with reference to the discussion of FIG. 3.

If the attribute is not listed in the list of known problem attributes for the wireless network ("No"), step 708 ascertains whether the attribute is listed in a list of uncharacterized attributes for the wireless network. The local configuration service 124, for instance, compares an attribute of the client device 102 to attributes included in the greylist 204.

If the attribute is listed in the list of uncharacterized attributes for the wireless network ("Yes"), step 710 applies a policy for uncharacterized attributes in determining a wireless connection parameter based on the attribute. The local configuration service 124, for instance, applies a greylist policy 304 to the attribute. In at least some implementations, an uncharacterized attribute may correspond to a known attribute that has not been tested and/or for which performance attributes have not been determined.

If the attribute is not listed in the list of uncharacterized attributes for the wireless network ("No"), step 712 applies a policy for unknown attributes in determining a wireless connection parameter based on the attribute. The local configuration service 124, for instance, notifies a user that the attribute in unknown and thus performance of the client device 102 on the WEN 104 may vary.

In at least some implementations, steps 708 and 710 are optional steps. For instance, the method may proceed from the "No" branch of step 704 to step 712, e.g., without checking against a greylist of device attributes.

Figure 8:
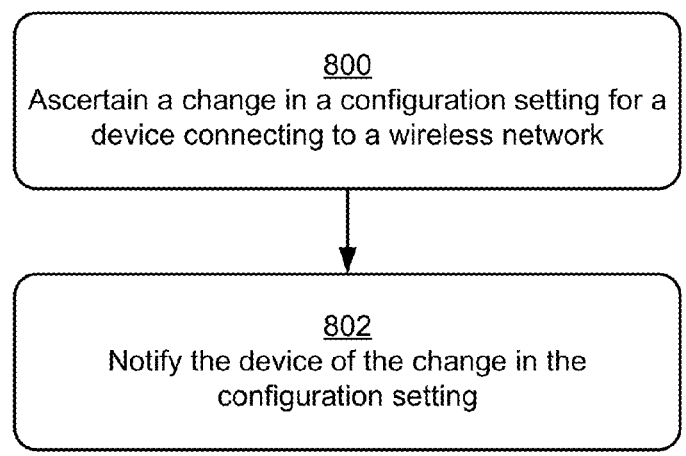
FIG. 8 is a flow diagram that describes steps in a method for identifying a change in a configuration setting to improve wireless performance in accordance with one or more embodiments.

FIG. 8 is a flow diagram that describes steps in a method in accordance with one or more embodiments. The method describes an example procedure for identifying a change in a configuration setting to improve wireless performance in accordance with one or more embodiments.

Step 800 ascertains a change in a configuration setting for a device connecting to a wireless network. The local configuration service 124, for instance, ascertains that a configuration setting of the client device 102 can be changed (e.g., from a current setting) to improve performance of the client device 102 over the WEN 104. In at least some implementations, improved performance can refer to higher data bandwidth rate, higher signal quality, lower signal errors (e.g., jitter, packet drop, and so forth), higher-quality media transfer, and so on, than may be provided by a current configuration setting.

Step 802 notifies the device of the change in the configuration setting. As discussed above, the notification may include a suggestion to a user such that the user can enact the configuration change. Alternatively or additionally, the notification may include an instruction (e.g., to the configuration module 126) that enables the change to the configuration setting to be automatically applied independent of user input.

Figure 9:
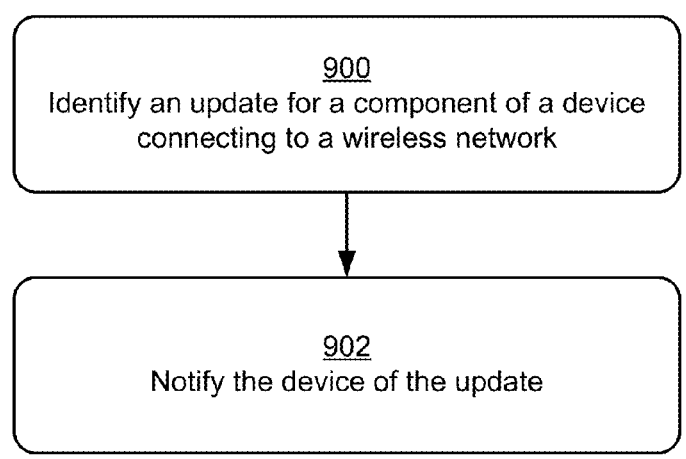
FIG. 9 is a flow diagram that describes steps in a method for identifying an update to a device component to improve device wireless performance in accordance with one or more embodiments.

FIG. 9 is a flow diagram that describes steps in a method in accordance with one or more embodiments. The method describes an example procedure for identifying an update to a device component to improve device wireless performance in accordance with one or more embodiments.

Step 900 identifies an update for a component of a device connecting to a wireless network. The local configuration service 124, for instance, ascertains that an update to a component of the client device 102 is available that is installable to improve performance of the client device 102 over the WEN 104. In at least some implementations, improved performance can refer to higher data bandwidth rate, higher signal quality, lower signal errors (e.g., jitter, packet drop, and so forth), higher-quality media transfer, and so on, than may be experienced by the device prior to the update being applied.

Step 902 notifies the device of the update. As discussed above, the notification may include a suggestion to a user such that the user can initiate retrieval and/or installation of the update. Alternatively or additionally, the notification may include an instruction (e.g., to the configuration module 126) that enables the update to be automatically applied independent of user input. The local configuration service 124, for instance, can push the update to the client device 102 for automatic installation.

Figure 10:
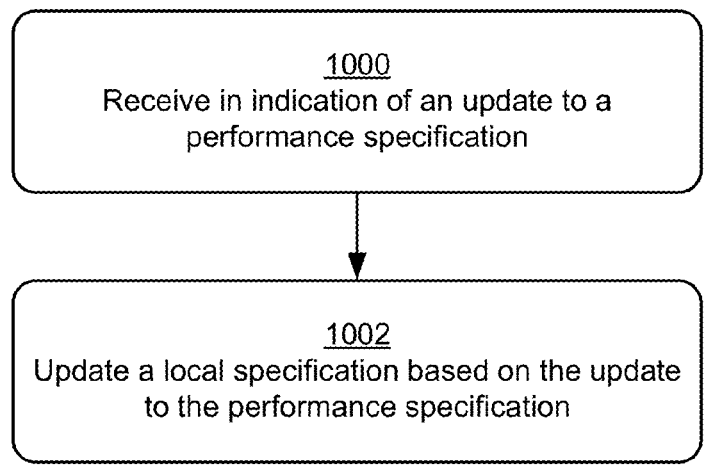
FIG. 10 is a flow diagram that describes steps in a method for updating a local network specification in accordance with one or more embodiments.

FIG. 10 is a flow diagram that describes steps in a method in accordance with one or more embodiments. The method describes an example procedure for updating a local network specification in accordance with one or more embodiments.

Step 1000 receives in indication of an update to a performance specification. The updated performance specification, for instance, indicates an update to a compatibility attribute for a device component and/or a device configuration setting. The local configuration service 124, for instance, receives from the remote configuration service 128 an indication of an update to a specification to be applied to the local specifications 120. The update, for instance, may be applicable to an existing local specification 120, and/or may correspond to a new local specification 120.

In at least some implementations, the local configuration service 124 can query the remote configuration service 128 for a specification update, such as periodically and/or dynamically in response to a particular event. In response to the query, the remote configuration service 128 can ascertain that the specifications DB 130 includes a specification update, and can provide the update to the network controller 118.

Alternatively or additionally, the remote configuration service 128 can push the update to the local configuration service 124, e.g., independent of a query from the local configuration service 124.

Step 1002 updates a local specification based on the update to the performance specification. The local configuration service 124, for example, applies the update to update the local specifications 120. The update, for instance, can be applied to the whitelist 200, the blacklist 202, the greylist 204, and/or other aspect of the local specifications 120.

Figure 11:
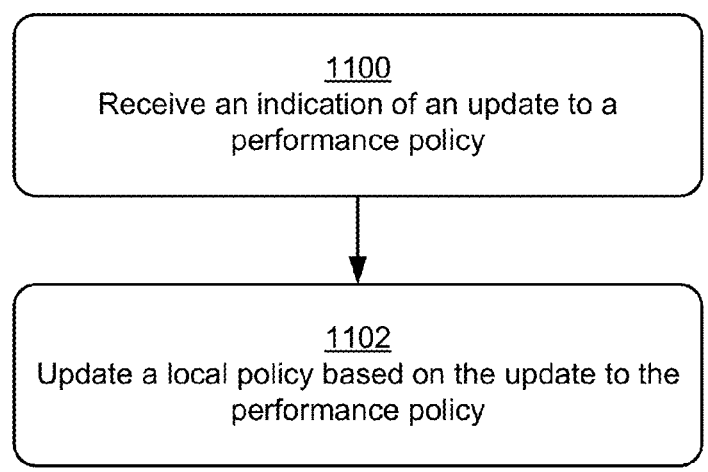
FIG. 11 is a flow diagram that describes steps in a method for updating a local policy in accordance with one or more embodiments.

FIG. 11 is a flow diagram that describes steps in a method in accordance with one or more embodiments. The method describes an example procedure for updating a local policy in accordance with one or more embodiments.

Step 1100 receives in indication of an update to a performance policy. The local configuration service 124, for instance, receives an indication of an update to a performance policy to be applied to the local policies 122. The update, for instance, may be applicable to an existing local policy 122, and/or may correspond to a new local policy 122.

In at least some implementations, the local configuration service 124 can query the remote configuration service 128 for a policy update, such as periodically and/or dynamically in response to a particular event. In response to the query, the remote configuration service 128 can ascertain that the policies DB 132 includes a policy update, and can provide the update to the local configuration service 124.

Alternatively or additionally, the remote configuration service 128 can push the update to the local configuration service 124, e.g., independent of a query from the local configuration service 124.

Step 1102 updates a local policy based on the update to the performance policy. The local configuration service 124, for example, applies the update to update the local policies 122. The update, for instance, can be applied to the whitelist policies 300, the blacklist policies 302, the greylist policies 304, and/or other aspect of the local policies 122.

Figure 12:
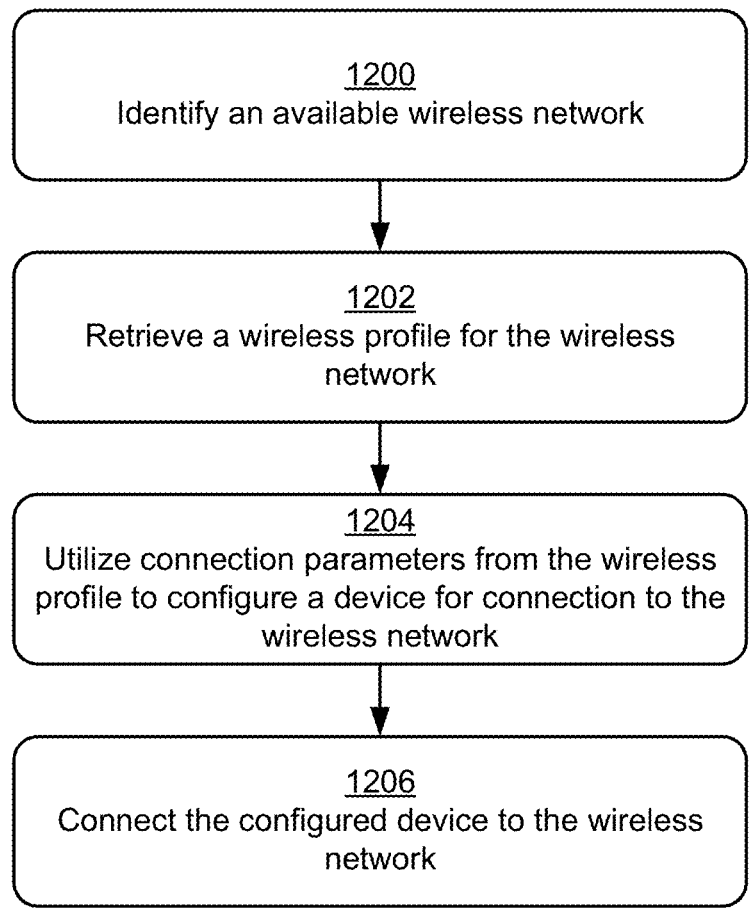
FIG. 12 is a flow diagram that describes steps in a method for utilizing a wireless profile for a wireless network in accordance with one or more embodiments.

FIG. 12 is a flow diagram that describes steps in a method in accordance with one or more embodiments. The method describes an example procedure for utilizing a wireless profile for a wireless network in accordance with one or more embodiments.

Step 1200 identifies an available wireless network. The client device 102, for instance, detects that the WEN 104 is available. For example, the client device 102 detects a beacon frame transmitted by a WAP 106.

Step 1202 retrieves a wireless profile for the wireless network. For example, the client device 102 searches the wireless profiles 138 for a wireless profile for the WEN 104. The client device 102, for instance, uses a network ID for the WEN 104 to search the wireless profiles 138, and locates a wireless profile 138 that matches the network ID. In at least some implementations, the wireless profile 138 is stored locally on the client device 102.

Step 1204 utilizes connection parameters from the wireless profile to configure a device for connection to the wireless network. The client device 102, for instance, utilizes connection parameters from the wireless profile 138 for the WEN 104 to configure various settings and/or components of the client device 102. Examples of different device settings and components that are configurable based on connection parameters are detailed above.

Step 1206 connects the configured device to the wireless network. For example, the client device 102 connects to the WEN 104 based on different settings and/or components that are configured and/or reconfigured based on the connection parameters.

In at least some implementations, the procedure discussed above can be implemented prior to the client device 102 connecting with the WEN 104, e.g., prior to and/or concurrently with requesting a connection to the WEN 104. Alternatively, the procedure can be implemented after the client device 102 connects to the WEN 104. The procedure, for instance, can be implemented prior to entering a quarantine state for the WEN 104 and/or while the client device 102 is in a quarantine state for the WEN 104. In at least some implementations, applying connection parameters from the wireless profile 138 can reduce the amount of time that the client device 102 is in a quarantine state. For instance, applying connection parameters from the wireless profile 138 can place the client device 102 in compliance with various local policies 122 for the WEN 104, and thus enable the client device 102 to more quickly transition from a quarantine state when connecting to the WEN 104.

Having discussed some example procedures, consider now a discussion of an example system and device in accordance with one or more embodiments.

Example System and Device

Figure 13:
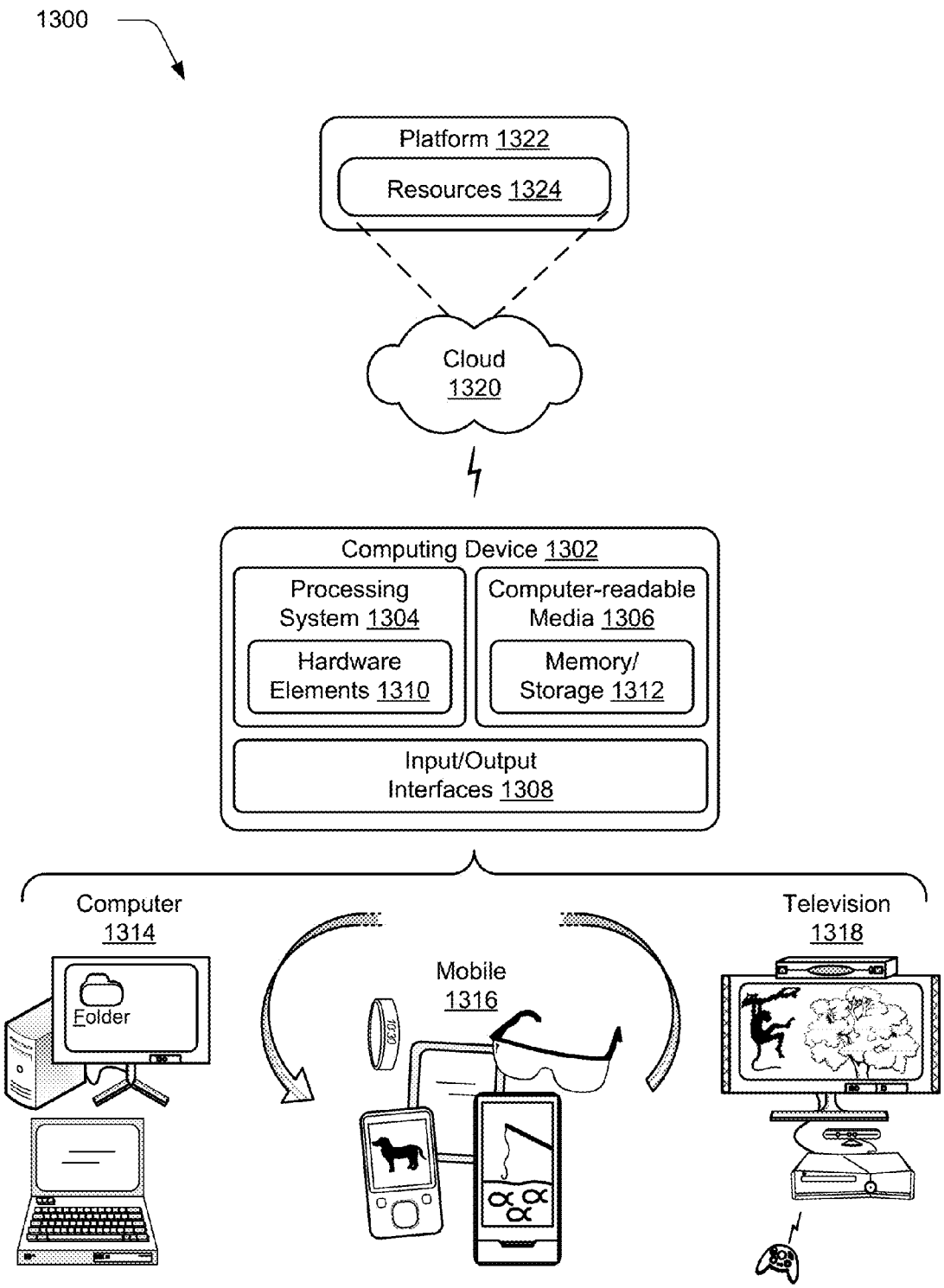
FIG. 13 illustrates an example system and computing device as described with reference to FIG. 1, which are configured to implement embodiments of techniques described herein.

FIG. 13 illustrates an example system generally at 1300 that includes an example computing device 1302 that is representative of one or more computing systems and/or devices that may implement various techniques described herein. For example, the client device 102, the network controller 118, and/or the remote configuration service 128 discussed above can be embodied as the computing device 1302. The computing device 1302 may be, for example, a server of a service provider, a device associated with the client (e.g., a client device), an on-chip system, and/or any other suitable computing device or computing system.

The example computing device 1302 as illustrated includes a processing system 1304, one or more computer-readable media 1306, and one or more Input/Output (I/O) Interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "service," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1310 and computer-readable media 1306 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules that are executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, a wearable device, portable music player, portable gaming device, a tablet computer, a multi-screen computer, and so on. The computing device 1302 may also be implemented as the television 1318 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. For example, functionalities discussed with reference to the client device 102, the network controller 118, and/or the remote configuration service 128 may be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi™ network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout the system 1300. For example, the functionality may be implemented in part on the computing device 1302 as well as via the platform 1322 that abstracts the functionality of the cloud 1320.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for device quarantine in a wireless network are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system perform operations including:
   placing a device in a quarantine state for a wireless network in response to a request from the device to connect to the wireless network;
   ascertaining one or more attributes of the device while the device is in the quarantine state including a hardware attribute and at least one attribute pertaining to a software attribute, a driver attribute, or a configuration setting attribute of the device, at least one of the attributes pertaining to a prospective quality of performance capability for the device over the wireless network;
   determining, based on the one or more attributes, one or more connection parameters for connection of the device to the wireless network based on comparing the one or more attributes to a local specification for the wireless network to ascertain compatibility of the one or more attributes with the wireless network, at least one local specification pertaining to a baseline quality of performance capability for a device over the wireless network; and releasing the device from the quarantine state such that the device is connected to the wireless network subject to the one or more connection parameters.

2. A system as recited in claim 1, wherein the quarantine state allows the device to interact with a configuration service of the wireless network and prevents the device from general access to the wireless network.

3. A system as recited in claim 1, wherein the system is implemented by at least one of a network controller for the wireless network or a remote configuration service.

4. A system as recited in claim 1, wherein said placing comprises placing the device in the quarantine state further in response to determining that the device is not registered with a network domain of the wireless network.

5. A system as recited in claim 1, wherein said determining the one or more connection parameters further comprises applying one or more local policies for the wireless network based on the ascertained compatibility of the one or more attributes with the wireless network.

6. A system as recited in claim 1, wherein said ascertaining comprises:
    querying the device for the one or more attributes; and
    receiving a response from the device identifying the one or more attributes.

7. A system as recited in claim 1, wherein said determining the one or more connection parameters is based on whether said comparing indicates a known compatibility problem for the one or more attributes with the wireless network.

8. A system as recited in claim 1, wherein the one or more connection parameters indicate a known compatibility problem between the one or more attributes and the wireless network, and wherein the operations further include sending a notification to the client device of the known compatibility problem.

9. A system as recited in claim 1, wherein said determining the one or more connection parameters comprises ascertaining a change in a configuration setting of the one or more attributes of the device that is applicable to improve performance of the device, and wherein the operations further include notifying the device of the change in the configuration setting.

10. A system as recited in claim 1, wherein said determining the one or more connection parameters comprises identifying an update to a component of the device that is installable to improve performance of the client device, and wherein the operations further include notifying the device of the update.

11. A computer-implemented method, comprising:
    placing a device in a quarantine state for a wireless network in response to a request from the device to connect to the wireless network;
    querying the device for one or more attributes of the device while the device is in the quarantine state, the one or more attributes including a hardware attribute and at least one attribute pertaining to a software attribute, a driver attribute, or a configuration setting attribute of the device, at least one of the attributes pertaining to a prospective quality of performance capability for participation in a communication event by the device over the wireless network;
    receiving a response from the device identifying the one or more attributes;
    determining, based on the one or more attributes of the device, one or more connection parameters for connection of the device to the wireless network, said determining including comparing the one or more attributes to at least one local specification for the wireless network to ascertain compatibility of the one or more attributes with the wireless network, at least one local specification pertaining to a baseline quality of performance capability for participation in a communication event by a device over the wireless network; and
    releasing the device from the quarantine state such that the device is connected to the wireless network subject to the connection parameters.

12. A method as described in claim 11, wherein said placing the device in the quarantine state comprises allowing the device to interact with a network controller of the wireless network, and preventing the device from general access to the wireless network.

13. A method as described in claim 11, wherein said comparing indicates a known compatibility problem between the one or more attributes of the device and the wireless network, the method further comprising notifying the device of the known compatibility problem.

14. A method as described in claim 11, wherein said determining the one or more connection parameters further comprises applying one or more local policies for the wireless network based on the ascertained compatibility of the one or more attributes with the wireless network.

15. A method as described in claim 11, further comprising, based on said comparing:
    ascertaining a change that is applicable to a configuration setting of the device; and
    notifying the device of the change to enable the change to be applied to the configuration setting.

16. A method as described in claim 11, further comprising:
    receiving an indication of an update to a performance specification that corresponds to an update to a compatibility attribute of at least one of a device component or a device configuration setting; and
    updating the local specification based on the update to the performance specification.

17. A client device comprising:
    at least one processor; and
    one or more computer-readable storage media including instructions stored thereon that, responsive to execution by the at least one processor, cause the system perform operations including:
        receiving a query for one or more attributes of the client device including a hardware attribute and at least one attribute pertaining to a software attribute, a driver attribute, or a configuration setting attribute of the device in response to a request from the client device to connect to a wireless network, at least one of the attributes pertaining to a prospective quality of performance capability for the client device over the wireless network;
        sending a query response that includes the one or more device attributes;
        receiving a notification that includes one or more connection parameters for connecting to the wireless network; and
        performing one or more actions based on the one or more connection parameters, the one or more actions including at least one of:

presenting a notification of a performance attribute for connection of the client device to the wireless network;
changing a configuration setting of the client device; or
updating a component of the client device.

18. A client device as described in claim 17, wherein the operations further include presenting the notification of the performance attribute via a graphical user interface (GUI) that displays a notification of a possible performance problem for the client device while connected to the wireless network.

19. A client device as described in claim 17, wherein the operations further include at least one of:
changing the configuration setting of the client device automatically and independent of user input; or
updating the component of the client device automatically and independent of user input.

20. A client device as described in claim 17, wherein the operations further include:
retrieving a wireless profile for the wireless network;
utilizing at least one connection parameter from the wireless profile to configure the client device for connection to the wireless network.

* * * * *